United States Patent
Vijayan et al.

(10) Patent No.: US 11,169,888 B2
(45) Date of Patent: Nov. 9, 2021

(54) CLIENT-SIDE REPOSITORY IN A NETWORKED DEDUPLICATED STORAGE SYSTEM

(71) Applicant: Commvault Systems, Inc., Tinton Falls, NJ (US)

(72) Inventors: Manoj Kumar Vijayan, Marlboro, NJ (US); Deepak Raghunath Attarde, Marlboro, NJ (US); Hetalkumar N. Joshi, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 315 days.

(21) Appl. No.: 16/224,383

(22) Filed: Dec. 18, 2018

(65) Prior Publication Data

US 2019/0227879 A1    Jul. 25, 2019

Related U.S. Application Data

(63) Continuation of application No. 14/673,021, filed on Mar. 30, 2015, now Pat. No. 10,191,816, which is a
(Continued)

(51) Int. Cl.
*G06F 17/00* (2019.01)
*G06F 11/14* (2006.01)
(Continued)

(52) U.S. Cl.
CPC ...... *G06F 11/1456* (2013.01); *G06F 11/1453* (2013.01); *G06F 11/1464* (2013.01);
(Continued)

(58) Field of Classification Search
CPC .... G06F 11/1456; G06F 16/22; G06F 16/951; G06F 11/1453; G06F 11/1469; G06F 11/1464; G06F 2201/80
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Cohen et al., The Age Penalty and its Effect on Cache Performance, USITS, 2001, retrieved on Mar. 19, 2018, retrieved from the Internet at <URL: https://www.usenix.org/legacy/event/usits01/full_papers/cohen/cohen.pdf> (Year: 2001).*

(Continued)

*Primary Examiner* — Tyler J Torgrimson
(74) *Attorney, Agent, or Firm* — Knobbe, Martens, Olson & Bear, LLP

(57) ABSTRACT

A storage system according to certain embodiments includes a client-side repository (CSR). The CSR may communicate with a client at a higher data transfer rate than the rate used for communication between the client and secondary storage. During copy operations, for instance, some or all of the data being backed up or otherwise copied to secondary storage is stored in the CSR. During restore operations, copies of the data stored in the CSR is accessed from the CSR instead of from secondary storage, improving performance. Remaining data blocks not stored in the CSR can be restored from secondary storage.

20 Claims, 9 Drawing Sheets

Related U.S. Application Data continuation of application No. 13/324,848, filed on Dec. 13, 2011, now Pat. No. 9,104,623.

(60) Provisional application No. 61/423,031, filed on Dec. 14, 2010.

(51) Int. Cl.
*G06F 16/22* (2019.01)
*G06F 16/951* (2019.01)

(52) U.S. Cl.
CPC .......... *G06F 11/1469* (2013.01); *G06F 16/22* (2019.01); *G06F 16/951* (2019.01); *G06F 2201/80* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,044,437 A | 3/2000 | Reinders |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,389,433 B1 | 5/2002 | Bolosky et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |

(56) References Cited

U.S. PATENT DOCUMENTS

| | | |
|---|---|---|
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescenti et al. |
| 7,065,619 B1 | 6/2006 | Zhu et al. |
| 7,082,441 B1 | 7/2006 | Zahavi |
| 7,085,904 B2 | 8/2006 | Mizuno et al. |
| 7,100,089 B1 | 8/2006 | Phelps |
| 7,103,617 B2 | 9/2006 | Phatak |
| 7,107,298 B2 | 9/2006 | Prahlad et al. |
| 7,107,395 B1 | 9/2006 | Ofek |
| 7,117,246 B2 | 10/2006 | Christenson et al. |
| 7,130,860 B2 | 10/2006 | Pachet |
| 7,130,970 B2 | 10/2006 | Devassy et al. |
| 7,143,091 B2 | 11/2006 | Charnock |
| 7,155,465 B2 | 12/2006 | Lee |
| 7,155,633 B2 | 12/2006 | Tuma |
| 7,162,496 B2 | 1/2007 | Amarendran et al. |
| 7,174,433 B2 | 2/2007 | Kottomtharayil et al. |
| 7,194,454 B2 | 3/2007 | Hansen |
| 7,197,665 B2 | 3/2007 | Goldstein |
| 7,225,210 B2 | 5/2007 | Guthrie, II |
| 7,243,163 B1 | 7/2007 | Friend et al. |
| 7,246,207 B2 | 7/2007 | Kottomtharayil et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,315,923 B2 | 1/2008 | Retnamma et al. |
| 7,343,356 B2 | 3/2008 | Prahlad |
| 7,343,453 B2 | 3/2008 | Prahlad et al. |
| 7,343,459 B2 | 3/2008 | Prahlad |
| 7,346,751 B2 | 3/2008 | Prahlad |
| 7,383,462 B2 | 6/2008 | Osaki et al. |
| 7,389,311 B1 | 6/2008 | Crescenti et al. |
| 7,395,282 B1 | 7/2008 | Crescenti et al. |
| 7,412,583 B2 | 8/2008 | Burton |
| 7,437,388 B1 | 10/2008 | DeVos |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,500,053 B1 | 3/2009 | Kavuri et al. |
| 7,512,595 B1 | 3/2009 | McBride et al. |
| 7,516,186 B1 | 4/2009 | Borghetti et al. |
| 7,519,726 B2 | 4/2009 | Palliyll et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,567,188 B1 | 7/2009 | Anglin et al. |
| 7,568,080 B2 | 7/2009 | Prahlad et al. |
| 7,574,692 B2 | 8/2009 | Herscu |
| 7,577,806 B2 | 8/2009 | Rowan |
| 7,581,077 B2 | 8/2009 | Ignatius et al. |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,664,771 B2 | 2/2010 | Kusters |
| 7,685,126 B2 | 3/2010 | Patel et al. |
| 7,702,782 B1 | 4/2010 | Pai |
| 7,720,841 B2 | 5/2010 | Gu et al. |
| 7,730,113 B1 | 6/2010 | Payette et al. |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,743,051 B1 | 6/2010 | Kashyap et al. |
| 7,747,577 B2 | 6/2010 | Cannon et al. |
| 7,747,579 B2 | 6/2010 | Prahlad et al. |
| 7,761,425 B1 | 7/2010 | Erickson et al. |
| 7,779,032 B1 | 8/2010 | Garfinkel |
| 7,797,279 B1 | 9/2010 | Starling et al. |
| 7,801,864 B2 | 9/2010 | Prahlad et al. |
| 7,809,914 B2 | 10/2010 | Kottomtharayil et al. |
| 7,814,074 B2 | 10/2010 | Anglin et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 7,840,533 B2 | 11/2010 | Prahlad et al. |
| 7,899,871 B1 | 3/2011 | Kumar et al. |
| 7,962,452 B2 | 6/2011 | Anglin et al. |
| 8,041,907 B1 | 10/2011 | Wu et al. |
| 8,074,043 B1 | 12/2011 | Zeis |
| 8,095,756 B1 | 1/2012 | Somavarapu |
| 8,108,446 B1 | 1/2012 | Christiaens |
| 8,108,638 B2 | 1/2012 | Kishi |
| 8,131,669 B2 | 3/2012 | Cannon et al. |
| 8,145,614 B1 | 3/2012 | Zimran et al. |
| 8,156,086 B2 | 4/2012 | Lu et al. |
| 8,170,995 B2 | 5/2012 | Prahlad et al. |
| 8,199,911 B1 | 6/2012 | Tsaur et al. |
| 8,200,638 B1 | 6/2012 | Zheng et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,224,875 B1 | 7/2012 | Christiaens et al. |
| 8,229,954 B2 | 7/2012 | Kottomtharayil et al. |
| 8,230,195 B2 | 7/2012 | Amarendran et al. |
| 8,261,240 B2 | 9/2012 | Hoban |
| 8,280,854 B1 | 10/2012 | Emmert |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan et al. |
| 8,370,315 B1 | 2/2013 | Efstathopoulos et al. |
| 8,370,542 B2 | 2/2013 | Lu et al. |
| 8,375,008 B1 | 2/2013 | Gomes |
| 8,375,181 B1 | 2/2013 | Kekre et al. |
| 8,407,190 B2 | 3/2013 | Prahlad et al. |
| 8,468,320 B1 | 6/2013 | Stringham |
| 8,479,304 B1 | 7/2013 | Clifford |
| 8,484,162 B2 | 7/2013 | Prahlad et al. |
| 8,510,573 B2 | 8/2013 | Muller et al. |
| 8,527,469 B2 | 9/2013 | Hwang et al. |
| 8,549,350 B1 * | 10/2013 | Dutch ................ G06F 21/6218 714/6.1 |
| 8,572,055 B1 | 10/2013 | Wu et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,825,720 B1 | 9/2014 | Xie et al. |
| 8,849,762 B2 | 9/2014 | Kumarasamy et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan et al. |
| 9,015,181 B2 | 4/2015 | Kottomtharayil et al. |
| 9,020,900 B2 | 4/2015 | Vijayan Retnamma et al. |
| 9,092,441 B1 | 7/2015 | Patiejunas et al. |
| 9,098,495 B2 | 8/2015 | Gokhale |

(56) References Cited

U.S. PATENT DOCUMENTS

| | | |
|---|---|---|
| 9,104,623 B2 | 8/2015 | Retnamma et al. |
| 9,110,602 B2 | 8/2015 | Vijayan et al. |
| 9,116,850 B2 | 8/2015 | Vijayan Retnamma et al. |
| 9,128,901 B1 | 9/2015 | Nickurak |
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan et al. |
| 9,244,779 B2 | 1/2016 | Littlefield et al. |
| 9,251,186 B2 | 2/2016 | Muller et al. |
| 9,298,386 B2 | 3/2016 | Baldwin et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |
| 9,336,076 B2 | 5/2016 | Baldwin et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,483,486 B1 | 11/2016 | Christiaens et al. |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan et al. |
| 9,665,591 B2 | 5/2017 | Vijayan et al. |
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,387,269 B2 | 8/2019 | Muller et al. |
| 10,445,293 B2 | 10/2019 | Attarde et al. |
| 10,474,638 B2 | 11/2019 | Mitkar et al. |
| 10,481,824 B2 | 11/2019 | Vijayan et al. |
| 10,481,825 B2 | 11/2019 | Vijayan et al. |
| 10,481,826 B2 | 11/2019 | Vijayan et al. |
| 10,540,327 B2 | 1/2020 | Ngo et al. |
| 10,592,357 B2 | 3/2020 | Vijayan et al. |
| 10,740,295 B2 | 8/2020 | Vijayan et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0084076 A1 | 5/2003 | Sekiguchi et al. |
| 2003/0105716 A1 | 6/2003 | Lorin, Jr. et al. |
| 2003/0115346 A1 | 6/2003 | McHenry et al. |
| 2003/0149750 A1 | 8/2003 | Franzenburg |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0128442 A1 | 7/2004 | Hinshaw et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1* | 12/2005 | Chen .................. G06F 11/2082 714/13 |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2006/0277154 A1 | 12/2006 | Lunt et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0050526 A1 | 3/2007 | Abe et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243769 A1 | 10/2008 | Arbour et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1* | 10/2008 | Cremelie ............ G06F 11/2097 711/162 |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |

(56) References Cited

U.S. PATENT DOCUMENTS

| | | |
|---|---|---|
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0013258 A1 | 1/2009 | Hintermeister et al. |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0182789 A1 | 7/2009 | Sandorfi et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0228599 A1 | 9/2009 | Anglin et al. |
| 2009/0243846 A1 | 10/2009 | Yuuki |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0011178 A1 | 1/2010 | Feathergill |
| 2010/0031086 A1 | 2/2010 | Leppard |
| 2010/0036887 A1 | 2/2010 | Anglin et al. |
| 2010/0042790 A1 | 2/2010 | Mondal et al. |
| 2010/0049926 A1 | 2/2010 | Fuente et al. |
| 2010/0049927 A1 | 2/2010 | Fuente et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0100529 A1 | 4/2010 | Erofeev |
| 2010/0114833 A1 | 5/2010 | Mu |
| 2010/0153511 A1 | 6/2010 | Lin et al. |
| 2010/0169287 A1 | 7/2010 | Klose |
| 2010/0180075 A1 | 7/2010 | McCloskey et al. |
| 2010/0198864 A1 | 8/2010 | Ravid et al. |
| 2010/0223495 A1 | 9/2010 | Leppard |
| 2010/0250501 A1 | 9/2010 | Mandagere et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0257403 A1 | 10/2010 | Virk et al. |
| 2010/0306283 A1 | 12/2010 | Johnson et al. |
| 2010/0306586 A1* | 12/2010 | Hanaoka ............ G06F 11/1441 714/19 |
| 2010/0312752 A1 | 12/2010 | Zeis et al. |
| 2010/0318759 A1 | 12/2010 | Hamilton et al. |
| 2010/0332401 A1 | 12/2010 | Prahlad et al. |
| 2010/0332454 A1 | 12/2010 | Prahlad et al. |
| 2011/0010498 A1 | 1/2011 | Lay et al. |
| 2011/0060940 A1 | 3/2011 | Taylor et al. |
| 2011/0072291 A1 | 3/2011 | Murase |
| 2011/0113012 A1 | 5/2011 | Gruhl et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0153570 A1 | 6/2011 | Kim et al. |
| 2011/0161723 A1 | 6/2011 | Taleck et al. |
| 2011/0167221 A1 | 7/2011 | Pangal et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0302140 A1 | 12/2011 | Gokhale et al. |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0016839 A1 | 1/2012 | Yueh |
| 2012/0016845 A1 | 1/2012 | Bates |
| 2012/0078881 A1 | 3/2012 | Crump et al. |
| 2012/0084272 A1 | 4/2012 | Garces-Erice et al. |
| 2012/0089574 A1 | 4/2012 | Doerner |
| 2012/0150818 A1 | 6/2012 | Vijayan Retnamma et al. |
| 2012/0166403 A1 | 6/2012 | Kim et al. |
| 2012/0185437 A1 | 7/2012 | Pavlov et al. |
| 2012/0221817 A1 | 8/2012 | Yueh |
| 2012/0233417 A1 | 9/2012 | Kalach |
| 2012/0303622 A1 | 11/2012 | Dean et al. |
| 2013/0006943 A1 | 1/2013 | Chavda et al. |
| 2013/0238562 A1 | 9/2013 | Kumarasamy et al. |
| 2013/0238572 A1 | 9/2013 | Prahlad et al. |
| 2013/0262396 A1 | 10/2013 | Kripalani et al. |
| 2013/0339298 A1 | 12/2013 | Muller et al. |
| 2013/0339310 A1 | 12/2013 | Muller et al. |
| 2014/0032940 A1 | 1/2014 | Sartirana et al. |
| 2014/0115287 A1 | 4/2014 | Schnapp et al. |
| 2014/0181028 A1 | 6/2014 | Prahlad et al. |
| 2014/0195749 A1 | 7/2014 | Colgrove et al. |
| 2014/0201142 A1 | 7/2014 | Varadharajan et al. |
| 2014/0201150 A1 | 7/2014 | Kumarasamy et al. |
| 2014/0201153 A1 | 7/2014 | Vijayan et al. |
| 2014/0229451 A1 | 8/2014 | Venkatesh et al. |
| 2014/0250076 A1 | 9/2014 | Lad |
| 2014/0258245 A1 | 9/2014 | Estes |
| 2014/0281758 A1 | 9/2014 | Klein et al. |
| 2014/0289225 A1 | 9/2014 | Chan et al. |
| 2014/0337285 A1 | 11/2014 | Gokhale et al. |
| 2014/0337664 A1 | 11/2014 | Gokhale et al. |
| 2015/0012698 A1 | 1/2015 | Bolla et al. |
| 2015/0088821 A1 | 3/2015 | Blea et al. |
| 2015/0089185 A1 | 3/2015 | Brandyberry et al. |
| 2015/0134611 A1 | 5/2015 | Avati et al. |
| 2015/0154220 A1 | 6/2015 | Ngo et al. |
| 2015/0161015 A1 | 6/2015 | Kumarasamy et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0248466 A1 | 9/2015 | Jernigan, IV et al. |
| 2015/0261776 A1 | 9/2015 | Attarde et al. |
| 2015/0269032 A1 | 9/2015 | Muthyala et al. |
| 2015/0269212 A1 | 9/2015 | Kramer et al. |
| 2015/0278104 A1 | 10/2015 | Moon et al. |
| 2015/0347306 A1 | 12/2015 | Gschwind |
| 2015/0378839 A1 | 12/2015 | Langouev et al. |
| 2016/0026405 A1 | 1/2016 | Dhuse |
| 2016/0041880 A1 | 2/2016 | Mitkar et al. |
| 2016/0042090 A1 | 2/2016 | Mitkar et al. |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0154709 A1 | 6/2016 | Mitkar et al. |
| 2016/0170657 A1 | 6/2016 | Suehr et al. |
| 2016/0188416 A1 | 6/2016 | Muller et al. |
| 2016/0196070 A1 | 7/2016 | Vijayan et al. |
| 2016/0299818 A1 | 10/2016 | Vijayan et al. |
| 2016/0306707 A1 | 10/2016 | Vijayan et al. |
| 2016/0306708 A1 | 10/2016 | Prahlad et al. |
| 2016/0306818 A1 | 10/2016 | Vijayan et al. |
| 2016/0350391 A1 | 12/2016 | Vijayan et al. |
| 2017/0031768 A1 | 2/2017 | Sarab |
| 2017/0083558 A1 | 3/2017 | Vijayan et al. |
| 2017/0083563 A1 | 3/2017 | Vijayan et al. |
| 2017/0090773 A1 | 3/2017 | Vijayan et al. |
| 2017/0090786 A1 | 3/2017 | Parab et al. |
| 2017/0168903 A1 | 5/2017 | Dornemann et al. |
| 2017/0185488 A1 | 6/2017 | Kumarasamy et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |

(56) References Cited

U.S. PATENT DOCUMENTS

| | | | |
|---|---|---|---|
| 2017/0192868 | A1 | 7/2017 | Vijayan et al. |
| 2017/0193003 | A1 | 7/2017 | Vijayan et al. |
| 2017/0235647 | A1 | 8/2017 | Kilaru et al. |
| 2017/0242871 | A1 | 8/2017 | Kilaru et al. |
| 2017/0262217 | A1 | 9/2017 | Pradhan et al. |
| 2017/0315876 | A1 | 11/2017 | Dornquast et al. |
| 2018/0075055 | A1 | 3/2018 | Ngo et al. |
| 2018/0189314 | A1 | 7/2018 | Mitkar et al. |
| 2018/0196720 | A1 | 7/2018 | Muller et al. |
| 2019/0012237 | A1 | 1/2019 | Prahlad et al. |
| 2019/0012328 | A1 | 1/2019 | Attarde et al. |
| 2019/0026305 | A1 | 1/2019 | Vijayan et al. |
| 2019/0179805 | A1 | 6/2019 | Prahlad et al. |
| 2019/0188088 | A1 | 6/2019 | Muller et al. |
| 2019/0205290 | A1 | 7/2019 | Vijayan et al. |
| 2019/0227879 | A1 | 7/2019 | Vijayan et al. |
| 2019/0272220 | A1 | 9/2019 | Vijayan et al. |
| 2019/0272221 | A1 | 9/2019 | Vijayan et al. |
| 2019/0310968 | A1 | 10/2019 | Attarde et al. |
| 2020/0104052 | A1 | 4/2020 | Vijayan et al. |
| 2020/0104213 | A1 | 4/2020 | Muller et al. |
| 2020/0117641 | A1 | 4/2020 | Mitkar et al. |
| 2020/0167091 | A1 | 5/2020 | Haridas et al. |
| 2020/0167240 | A1 | 5/2020 | Haridas et al. |
| 2020/0250145 | A1 | 8/2020 | Ngo et al. |
| 2020/0327017 | A1 | 10/2020 | Vijayan et al. |
| 2020/0334210 | A1 | 10/2020 | Vijayan et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |

OTHER PUBLICATIONS

Armstead et al., "Implementation of a Campus-Wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Bhagwat, Extreme Binning: Scalable, Parallel Deduplication for Chunk-based File Backup. IEEE 2009, 9 pages.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cohen, Edith, et al.,. "The Age Penalty and Its Effect on Cache Performance." In USITS, pp. 73-84. 2001.

Cohen, Edith, et al.,."Aging through cascaded caches: Performance issues in the distribution of web content." In ACM SIGCOMM Computer Communication Review, vol. 31, No. 4, pp. 41-53. ACM, 2001.

Cohen, Edith, et al.,. "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#2 of 2, pp. 604-609), Jim; Reuter Andreas, Transaction Processing Concepts and Techniques, Morgan Kaufmann Publisher, USA 1994, pp. 604-609.

Guo et al., Building a High-performance Deduplication System, Jun. 15, 2011, retrieved from the Internet at <URL: http://dl.acm.org/citation.cfm?id=2002206>, pp. 1-14.

Huff, KL, "Data Set Usage Sequence Number," IBM Technical Disclosure Bulletin, vol. 24, No. 5, Oct. 1981 New York, US, pp. 2404-2406.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structure File System," Operating Systems Review SIGOPS, vol. 25, No. 5, New York, US, pp. 1-15 (May 1991).

Wei, et al. "MAD2: A scalable high-throughput exact deduplication approach for network backup services." Mass Storage Systems and Technologies (MSST), 2010 IEEE 26th Symposium on. IEEE, 2010, 14 pages.

Wolman et al., On the scale and performance of cooperative Web proxy caching, 1999.

Wu, et al., Load Balancing and Hot Spot Relief for Hash Routing among a Collection of Proxy Caches, 1999.

Final Office Action for Japanese Application No. 2003531581, dated Mar. 24, 2009, 6 pages.

International Search Report and Written Opinion, International Application No. PCT/US2009/58137, dated Dec. 23, 2009, 14 pages.

International Search Report and Written Opinion, International Application No. PCT/US2011/030804, dated Jun. 9, 2011.

International Search Report and Written Opinion, International Application No. PCT/US2011/030814, dated Jun. 9, 2011.

International Search Report and Written Opinion, International Application No. PCT/US2013/045443 dated Nov. 14, 2013, 16 pages.

(56) References Cited

OTHER PUBLICATIONS

International Preliminary Report on Patentability, International Application No. PCT/US2013/045443 dated Dec. 16, 2014 11 pages.

* cited by examiner

CLIENT-SIDE REPOSITORY IN A NETWORKED DEDUPLICATED STORAGE SYSTEM

INCORPORATION BY REFERENCE TO ANY PRIORITY APPLICATIONS

Any and all applications for which a foreign or domestic priority claim is identified in the Application Data Sheet, or any correction thereto, are hereby incorporated by reference into this application under 37 CFR 1.57.

BACKGROUND

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

As such, enterprises are generating ever increasing volumes of data and corresponding storage requirements. Moreover, enterprise storage systems are typically distributed over one or more networks, such as where backup storage is remote from client computers. In such situations, backup storage operations place heavy demands on available network bandwidth.

SUMMARY

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or data blocks). As new data enters the system, the data units can be checked to see if they already exist in the storage system. If the data unit already exists, instead of storing and/or communicating a duplicate copy, the storage system stores and/or communicates a reference to the existing data segment. Thus, deduplication can improve storage utilization, system traffic (e.g., over a networked storage system), or both.

Deduplication techniques designed to reduce the demands on storage systems during backup and/or replication operations are described in greater detail in the following U.S. patent applications, each of which is incorporated by reference in its entirety. One or more embodiments of the present disclosure may be used with systems and methods disclosed therein:

U.S. patent application Ser. No. 13/324,613, entitled "Distributed Deduplicated Storage System," and filed on Dec. 13, 2011;

U.S. patent application Ser. No. 12/982,086, entitled "Content Aligned Block-Based Deduplication," filed Dec. 30, 2010;

U.S. patent application Ser. No. 12/982,100, entitled "Systems and Methods for Retaining and Using Block Signatures in Data Protection Operations," filed Dec. 30, 2010

U.S. patent application Ser. No. 12/145,347, entitled "Application-Aware and Remote Single Instance Data Management," filed Jun. 24, 2008;

U.S. patent application Ser. No. 12/145,342, entitled "Application-Aware and Remote Single Instance Data Management," filed Jun. 24, 2008; and U.S. patent application Ser. No. 12/725,288, entitled "Extensible Data Deduplication System and Method," filed Mar. 16, 2010.

In addition, one or more embodiments of the present disclosure may also be used with systems and methods disclosed in the following patents, each of which is hereby incorporated herein by reference in its entirety:

U.S. Pat. No. 7,389,311, entitled "Hierarchical Backup and Retrieval System," issued Jun. 17, 2008;

U.S. Pat. No. 6,418,478, entitled "Pipelined High Speed Data Transfer Mechanism," issued Jul. 9, 2002;

U.S. Pat. No. 7,035,880, entitled "Modular Backup and Retrieval System Used in Conjunction with a Storage Area Network," issued Apr. 25, 2006;

U.S. Pat. No. 6,542,972, entitled "Logical View and Access to Physical Storage in Modular Data and Storage Management System," issued Apr. 1, 2003;

U.S. Pat. No. 6,658,436, entitled "Logical View and Access to Data Manage by a Modular Data and Storage Management System," issued Dec. 2, 2003;

U.S. Pat. No. 7,130,970, entitled "Dynamic Storage Device Pooling in a Computer System," issued Oct. 10, 2006;

U.S. Pat. No. 7,246,207, entitled "System and Method for Dynamically Performing Storage Operations in a Computer Network," issued Jul. 17, 2007;

U.S. Pat. No. 7,454,569, entitled "Hierarchical System and Method for Performing Storage Operations in a Computer Network," issued Nov. 18, 2008;

U.S. Pat. No. 7,613,748, entitled "System and Method for Containerized Data Storage and Tracking," issued Nov. 3, 2009; and U.S. Pat. No. 7,620,710, entitled "Systems and Methods for Performing Multi-Path Storage Operations," issued Nov. 17, 2009.

However, even in those systems employing deduplication, restore operations, including operations where data is restored from backup storage to a client, can place equally heavy demands on available network bandwidth and available system resources. Restore operations can also introduce significant delay due to communication latency between backup storage and the client.

In accordance with certain aspects of the disclosure, one technique developed to address these challenges incorporates the use of a client-side repository. A client-side repository (CSR) can be used as part of a storage system to reduce the demands on the network between a client and secondary storage, such as backup storage. For example, a CSR can be located in proximity to the client or may share a common network topology with the client whereas the client and the backup storage devices may be remote from one another or reside on differing network topologies. As just one example, the CSR and the client may communicate over a local area network (LAN), while client and secondary storage communicate over a wide area network (WAN). Thus, the CSR can communicate more effectively (e.g., at a higher data transfer rate, more reliably, with less latency, etc.) with the client than the backup storage devices can communicate with the client.

During backup or other secondary storage operations (e.g., copy, replication, or snapshot operations), some or all of the data to be copied from the client can be stored in the CSR in addition to being stored in the backup storage devices. Upon restore, the CSR can restore the data stored therein to the client. This data is therefore not transmitted from the backup storage to the client. The remaining data is transmitted from the backup storage to the client in the normal fashion. In this manner, the CSR can reduce the system traffic between the client and the backup storage devices and reduce the amount of time used to restore the client.

In certain embodiments, a method of restoring deduplicated data to a client from a destination storage system is provided. The method can include receiving one or more queries from a destination storage system inquiring as to the presence of a plurality of data blocks in a data repository of a client-side repository. The data blocks may correspond to at least a portion of data that has been previously copied from a client to the destination storage system according to a deduplication scheme. The destination storage system may be remote from the client and the client-side repository. The method can further include consulting, consulting, using one or more processors, a signature repository of the client-side repository having stored thereon signatures corresponding to the data blocks in the data repository. The consulting may be performed in response to the one or more queries and to determine which of the queried data blocks are stored in the data repository of the client-side repository. The method may further include restoring the data blocks that are stored in the data repository of the client-side repository from the data repository to the client.

According to some embodiments, a storage system is provided including a client-side repository comprising a data repository storing a plurality of data blocks, the data blocks corresponding to at least a portion of data that has been previously copied from an information store of a client to a destination storage system according to a deduplication scheme. The client-side repository may further include a signature repository storing signatures corresponding to the data blocks in the data repository, the data repository and the signature repository remote from the destination storage system. The storage system may further include a control module executing in one or more processors and configured to receive one or more queries inquiring as to the presence of a plurality of data blocks in the data repository. The control module may further be configured to consult the signature repository in response to the one or more queries to determine which of the queried data blocks are stored in the data block repository. The control module may additionally be configured to restore the data blocks that are stored in the data block repository from the data block repository to the information store of the client.

In certain embodiments, a method of restoring deduplicated data from a destination storage system to an information store associated with a client is provided. The method may include, in response to instructions to copy data from an information store associated with a client system to at least one destination storage system remote from the client system: copying at least a portion of the data from the information store to a data repository of a client-side repository as a plurality of data blocks, the client-side repository being remote from the destination storage system, wherein the data from the information store is copied to the destination storage system according to a deduplication scheme. Also in response to the instructions, the method may include populating a signature repository of the client-side repository with a plurality of deduplication signatures corresponding to the data blocks stored in the data repository of the client-side repository. During a restore operation in which the copied data is restored from the destination storage system to the client, the method may include receiving a plurality of queries inquiring as to the presence of the plurality of data blocks in the client-side repository. Also during the restore operation the method may include consulting the signature repository of the client-side repository using one or more processors and in response to the queries to determine which of the data blocks are stored in the data repository of the client-side repository. Also during the restore operation, the method may include restoring data blocks that are stored in the data repository of the client-side repository from the client-side repository to the client, the data blocks not stored in the data repository of the client-side repository being restored from the destination storage system to the client.

In certain embodiments, a method of restoring deduplicated data to an information store associated with a client from a destination storage system is provided. The method can include sending one or more queries to a client-side repository inquiring as to the presence of a plurality of data blocks in a data repository of a client-side repository, the data blocks corresponding to at least a portion of data that has been previously copied from an information store of a client to the destination storage device according to a deduplication scheme, the destination storage device remote from the client and the client-side repository. The method can further include receiving an indication as to which of the queried data blocks are stored in the data repository of the client-side repository. The method may include restoring the data blocks that are not stored in the data repository of the client-side repository from the destination storage device to the information store of the client.

In yet other embodiments, a storage system is provided. The storage system can include at least one destination storage device storing data that has been previously copied from an information store of a client to the destination storage device according to a deduplication scheme. The storage system can further include a control module executing in one or more processors and configured to send one or more queries to a client-side repository inquiring as to the presence of a plurality of data blocks in a data repository of the client-side repository, the data blocks corresponding to at least a portion of the data that was copied from the information store of the client to the destination storage device, the destination storage device remote from the client and the client-side repository. The control module can further be configured to receive an indication as to which of the queried data blocks are stored in the data repository of the client-side repository. Additionally, the control module can be configured to restore the data blocks that are not stored in the data repository of the client-side repository from the destination storage device to the information store of the client.

In certain embodiments, a method is provided of modifying a client-side repository usable during restore operations in a deduplicated storage system, the method including monitoring the use of a client-side repository using one or more processors, the client-side repository usable during copy and restore operations. The copy operations can include storing data blocks and signatures corresponding to the data blocks in the client-side repository, the data blocks corresponding to at least a portion of data that is copied from a client system to a destination storage system according to a deduplication scheme. The restore operations may include restoring the data blocks not stored in the client-side repository from the destination storage system to the client system and restoring the data blocks stored in the client-side repository from the client-side repository to the client system. In certain embodiments, the method includes determining whether the use of the client-side repository meets a usage threshold in response to the monitoring. The method can also include, upon determining that the use of the client-side repository meets a usage threshold, tuning a client-side repository parameter.

In certain embodiments, a storage system is provided having a client-side repository. The client-side repository can include a data repository storing a plurality of data blocks. The data blocks corresponding to at least a portion of data that has been previously copied from a client system to a destination storage system according to a deduplication scheme. In certain embodiments the client-side repository also includes a signature repository storing signatures corresponding to the data blocks in the data repository. The data repository and the signature repository may be remote from the destination storage system. The system may further include a control module executing in one or more processors and configured to monitor the use of the client-side repository during restore operations, wherein the restore operations include restoring the data blocks not stored in the client-side repository from the destination storage system to the client system and restoring the data blocks stored in the client-side repository from the client-side repository to the client system. The control module may further be configured to determine whether the use of the client-side repository meets a usage threshold in response to the monitoring. In addition, the control module may be configured to, upon determining that the use of the client-side repository meets a usage threshold, tune a client-side repository parameter.

In certain embodiments, a method of modifying a client-side repository usable during restore operations in a de-duplicated storage system is provided. The method may include populating a client-side repository with a plurality of data blocks, the data blocks corresponding to at least a portion of data that is copied from a client system to a destination storage system according to a deduplication scheme. The method can further include populating the client-side repository with deduplication signatures corresponding to the data blocks that are stored in the client-side repository. The method can also include, during at least one restore operation in which the data is restored to the client system, determining which of the plurality of data blocks are stored in the client-side repository with one or more processors and at least in part based on the deduplication signatures stored in the client-side repository. During the at least one restore operation, the method can also include accessing the client-side repository to restore the data blocks that are stored in the client-side repository from the client-side repository to the client system, wherein the data blocks that are not stored in the client-side repository are restored from the destination storage system to the client system. The method can also include generating a performance metric relating to the at least one restore operation. The method may further include modifying a parameter associated with the client-side repository in response to the performance metric not meeting a threshold condition.

In certain embodiments, a storage system is provided. The storage system can include at least one destination storage device storing a plurality of data blocks corresponding to data that has been previously copied from a client system to the destination storage device according to a deduplication scheme. The storage system may further include a control module executing in one or more processors. The control module may be configured to monitor the use of a client-side repository during restore operations. The client-side repository may include a data repository storing at least a portion of the data blocks that were previously copied to the destination storage system. The client-side repository may further include a signature repository storing signatures corresponding to the data blocks in the data repository, the data repository and the signature repository remote from the destination storage device. The restore operations can include restoring the data blocks not stored in the client-side repository from the destination storage device to the client system and restoring the data blocks stored in the client-side repository from the client-side repository to the client system. The control module may further be configured to determine whether the use of the client-side repository meets a usage threshold in response to the monitoring, upon determining that the use of the client-side repository meets a usage threshold, tune a client-side repository parameter.

In certain embodiments, a method of restoring deduplicated data from a destination storage system to a client system is provided. The method may include, during a restore operation in which data is restored to a client system from a destination storage system, the data previously copied as a plurality of data blocks with corresponding deduplication signatures to the destination storage system according to a deduplication scheme, and at least some of the data blocks previously copied along with corresponding deduplication signatures to a client-side repository that is remote from the destination storage system, grouping a plurality of the deduplication signatures stored at the destination storage system into one or more bundles using one or more processors. The method can further include sending the bundles to the client-side repository. The method may also include receiving an indication from the client-side repository as to which of the data blocks corresponding to the signatures in the bundles are stored in the client-side repository. In certain embodiments, the method includes accessing the destination storage system to restore data blocks not stored in the client-side repository from the destination storage system to the client system, wherein the data blocks that are stored in the client-side repository are restored from the client-side repository to the client system.

In certain embodiments, a storage system is provided comprising at least one destination storage device storing data that was previously copied to the destination storage device from a client system as a plurality of data blocks and according to a deduplication scheme. The storage system may also include a control module executing in one or more processors and configured to, during at least one restore operation in which the data is restored to the client system. The control module may further be configured to group a plurality of queries into one or more query bundles, each query of the one or more query bundles being associated with a data block to restore to the client system and comprising a signature associated with the data block. The control module may be configured to send at least one of the query bundles to the client-side repository. The control module can be configured to receive an indication from the client-side repository as to whether one or more of the data blocks associated with the at least one query bundle are stored in the client-side repository. In some embodiments, the control module is configured to access the destination storage device to restore data blocks not stored in the client-side repository from the destination storage device to the client system, wherein the data blocks that are stored in the client-side repository are restored from the client-side repository to the client system.

In certain embodiments, a method of restoring deduplicated data from a destination storage system to a client system is provided. The method can include receiving from a destination storage system, at a client-side repository remote from the destination storage system, one or more query bundles, wherein data from the client system was previously copied to the destination storage system as a plurality of data blocks according to a deduplication scheme, each query bundle inquiring as to the presence of a plurality of the data blocks at the client-side repository. In certain embodiments, the method also includes consulting a signature repository of the client-side repository using one or more processors and in response to each of the query bundles to determine which of the plurality of data blocks associated with query bundle are stored in the client-side repository. The method can further include indicating to the destination storage system which of the plurality of data blocks associated with the respective query bundles are stored in the client-side repository. The method in certain embodiments includes restoring the one or more data blocks stored in the client-side repository from the client-side repository to the client system.

In certain embodiments, a storage system is provided having a client-side repository, comprising: a data repository storing a plurality of data blocks, the data blocks corresponding to at least a portion of data that has been previously copied from a client system to a destination storage system according to a deduplication scheme. The client-side repository may include a signature repository storing signatures corresponding to the data blocks in the data repository, the data repository and the signature repository remote from the destination storage system. The client-side repository may also include a control module configured to receive one or more query bundles from the destination storage system, each query bundle inquiring as to the presence of a plurality of the data blocks at the client-side repository. The control module may be configured to consult the signature repository in response to each of the received query bundles to determine which of the plurality of data blocks associated with query bundle are stored in the data repository. The control module may further be configured to indicate to the destination storage system which the plurality of data blocks associated with the received query bundles are stored in the data block repository. The control module may also be configured to restore the one or more data blocks stored in the data block repository from the client-side repository to the client system.

In certain embodiments, a method for restoring data to a client system from a destination storage system is provided. The method can include, for each of a plurality of data blocks previously copied to a destination storage system according to a deduplication scheme, consulting an archive file identifier corresponding to the data block to determine age information associated with the data block. Based on the age information and using one or more processors, the method can include determining whether to query a client-side repository remote from the destination storage system as to whether the client-side repository is populated with a copy of the data block. The method can also include querying the client-side repository from the destination storage system as to whether the client-side repository is populated with a copy of the data block based on the determination. The method may include restoring data blocks that are not stored in the client-side repository from the destination storage system to the client system, wherein the data blocks that are stored in the client-side repository are restored from the client-side repository to the client system.

In certain embodiments, a storage system is provided comprising at least one destination storage device storing data that was previously copied to the destination storage device from a client system as a plurality of data blocks and according to a deduplication scheme. The storage system may further include a control module executing in one or more processors. The control module may be configured to consult an archive file identifier corresponding to the data block to determine age information associated with the data block. The control module can also be configured to, based on the age information and using one or more processors, determine whether to query a client-side repository remote from the destination storage system as to whether the client-side repository is populated with a copy of the data block. The control module may also be configured to query the client-side repository from the destination storage system as to whether the client-side repository is populated with a copy of the data block based on the determination. In some embodiments, the control module is configured to restore data blocks that are not stored in the client-side repository from the destination storage system to the client system, wherein the data blocks that are stored in the client-side repository are restored from the client-side repository to the client system.

DETAILED DESCRIPTION

Client-Side Repository Overview

Figure 1:
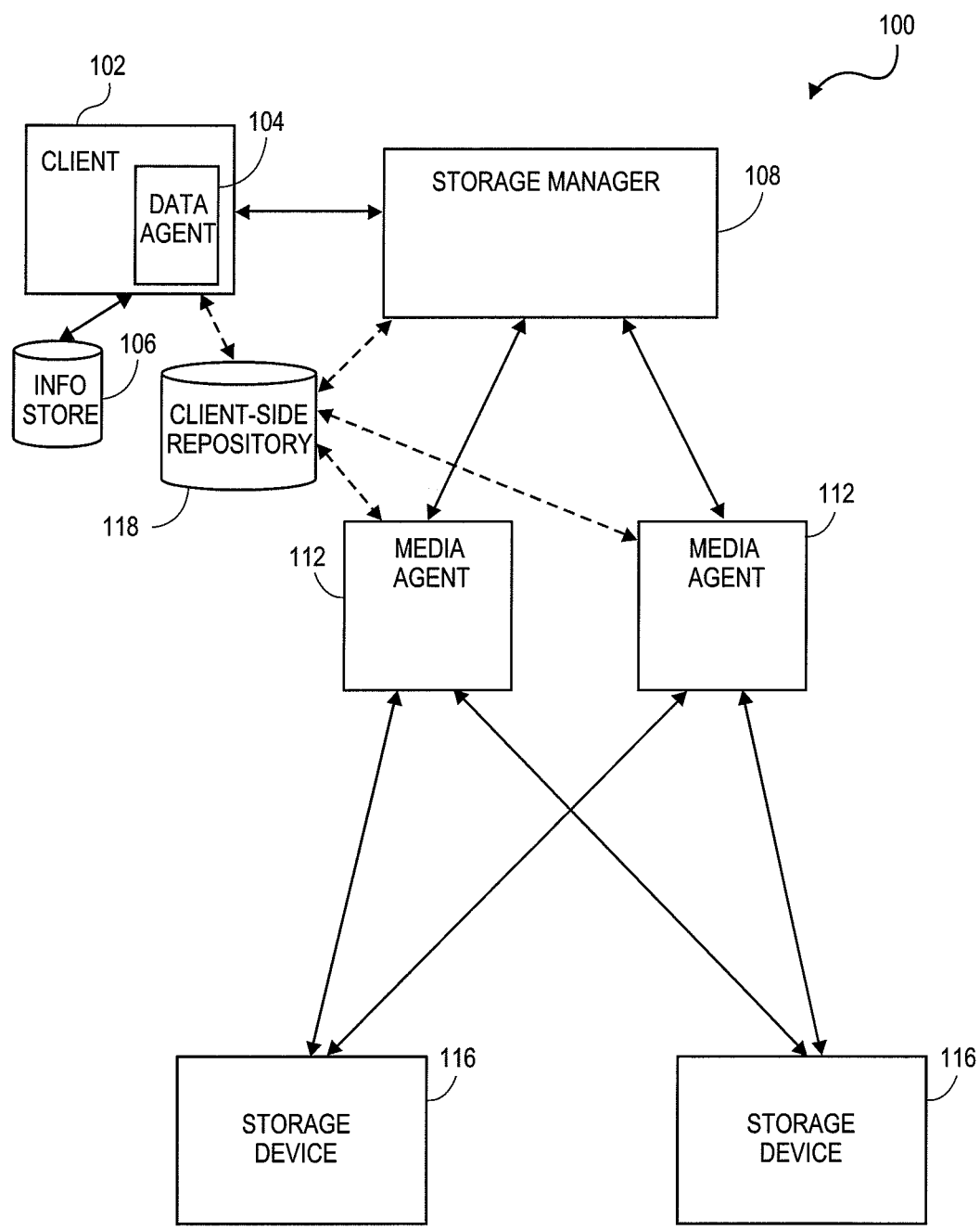
FIGS. 1 and 2 are block diagrams that illustrate components of example storage systems configured to implement techniques compatible with embodiments described herein.

The present disclosure is directed to a system, method, and computer-readable non-transitory storage medium for storing data to and restoring data from a storage system including a client-side repository (CSR). Specifically, aspects of the disclosure will be described with regard to storing deduplicated data in both a CSR and secondary storage (e.g., during backup or other copy operations) and restoring data from both the CSR and secondary storage during restore. Although various aspects of the disclosure will be described with regard to examples and embodiments, one skilled in the art will appreciate that the disclosed embodiments and examples should not be construed as limiting.

While described primarily with respect to backup operations for the purposes of illustration, the techniques described herein may be equally compatible with other types of storage operations including copy, replication, snapshot and archive operations, to name a few. A description of some storage operations compatible with embodiments described herein is provided near the end of this disclosure.

In accordance with aspects described herein, data is broken up into data blocks, or data segments for processing. For example, the data blocks can be used for the purposes of removing duplicate data blocks and replacing them with references to those blocks during data deduplication. Thus, a data block refers to a portion of data. The data blocks can vary in size based on system preferences. While other compatible data reduction techniques are possible, the embodiments described herein are described primarily in relation to data deduplication for clarity. Moreover, certain aspects described herein are compatible with systems that do not incorporate data reduction techniques.

In order to identify data blocks, various functions can be performed on individual data blocks to generate a unique or substantially unique signature corresponding to the data block. For example, hash functions and the like can be used, as described in greater detail in any of the applications incorporated by reference herein, such as, for example, the application entitled "Content-Aligned Block-Based Deduplication." Any number of different hash functions or other operations can be performed on the data blocks, such as SHA-512, for example. The hash or other signature can be used for a variety of purposes. For example, the signature can be used to determine if two data blocks contain the same data for the purposes of deduplication. As will be described in greater detail below, the signature can also be used to efficiently determine whether a data block exists in a client-side repository.

As described above, storage systems described herein can backup and restore data to a client using a CSR. The data can include deduplicated data. The present disclosure describes certain embodiments that selectively store at least some of the data that is sent to the backup storage device in the CSR. Moreover, the data can be kept in the CSR for a predetermined period of time. For example, a client can communicate with a media agent associated with the backup storage devices to backup the data stored in the client at a predetermined time interval. The system can employ deduplication techniques to reduce the amount of data stored and the time and network resources used to backup the data.

The CSR can be employed to reduce the time and network resources used during restore operations. For instance, during backup client data, the storage system stores a first copy of the data in the backup storage device and stores a second copy of the data in the CSR. The second copy may include a subset or signature of the first copy, and not all of the data in some cases. And a hash or other signature corresponding to each data block can be stored along with the respective data block.

At least some of the data is restored from the CSR rather than from backup storage in some embodiments. For example, during restore, the storage system queries the CSR for the data blocks stored therein. The query can include a hash or other signature of a data block that is to be restored. If the data block is located in the CSR, the storage system restores the data block using the copy in the CSR. To determine if the data block is stored in the CSR, a signature, or hash, included in the query may be compared with signatures, or hashes, located in the CSR. A match indicates that the data block is stored in the CSR, and the corresponding data block can be restored to the client from the CSR rather than from secondary storage. On the other hand, if the data block is not located in the CSR, the storage system can restore the data block from secondary storage.

In addition, the description includes embodiments for altering, or tuning, the CSR according to system preferences. For example, as network demand increases between the client and media agent as a result of restore operations, the storage system can determine that a threshold is met. In response to the threshold being met, the storage system can advantageously tune the CSR to accommodate the increased network demand. For example, the storage system can increase the storage capacity of CSR to reduce the network traffic between the client and the media agent. By dynamically tuning the CSR, the system can achieve further system performance improvement.

According to other aspects, systems described herein bundle queries to the CSR. The communication channel between the CSR and the media agent may be a relatively high latency channel, and during restore operations, as the media agents query the CSR for various data blocks, system performance can be adversely affected. Thus, the storage system can bundle the queries to the CSR to efficiently utilize network resources. In an embodiment, instead of sending queries for groups of data blocks to the CSR serially, the storage system packages together and transmits multiple queries at the same time. Additional logic can be used to determine which and how many queries to bundle. For example, bundling can be implemented based on a predefined number of queries, network bandwidth, data/file location within the backup storage device or information store of the client, etc. Furthermore, the queries can be bundled according to a signature block value, an archive file identifier (AFID), a hash signature value, a location within the backup storage device, an offset, and/or a previous storage location within the information store and/or pseudo-randomly. Bundling the queries can reduce the overhead associated with each query, and free up network bandwidth for other operations.

The description further includes embodiments for reviewing age or other appropriate information related to data blocks before querying the CSR for those data blocks. As mentioned previously, during the restore operation many queries can be sent to the CSR. Rather than querying the CSR for all data blocks associated with a client, the storage system can determine which data blocks are likely stored in CSR and query the CSR for only those data blocks, thereby reducing the overall number of queries. For example, over time the data in CSR can be pruned (e.g., deleted or overwritten) according to client preferences. In one embodiment, the data blocks in CSR are overwritten after a predefined time interval, such as 10 days.

In order to track data block aging, each data block stored in CSR and the backup storage device can have age information associated with it. For example, the storage system can assign an archive file identifier (AFID) indicating an age associated with the data block. For example, AFIDs are assigned sequentially incrementing values in one configuration. The AFIDs may be unique to each backup or other storage operation session, to each data block, or can be assigned according to some other scheme, depending on the embodiment. The storage system can review the AFID associated with the data blocks to be restored and determine the relative age of the block based on various factors, such as the number of AFIDs assigned over a period of time, last AFID assigned vs. AFID of data block to be restored, etc. In this manner, the AFID can be used to determine the likelihood that the data block associated with the AFID is stored in the CSR. If it is likely that the data block is stored in the CSR, the storage system can query the CSR for the data block Otherwise, the storage system can restore the data using the backup storage device without querying the CSR.

Illustrative explanations of several terms used throughout the disclosure are provided herein. While these meanings apply to the respective terms as used with respect to certain embodiments, it will be appreciated that the meanings can vary depending on the embodiment. Additionally, the meanings of these and other terms used herein will be understood in view of their usage throughout the entirety of the disclosure.

Example Storage Systems Including Client-Side Repositories

FIG. 1 illustrates a block diagram of an example network storage architecture compatible with embodiments described herein. The system 100 is configured to perform storage operations on electronic data, including deduplicated data, in a computer network.

As shown, the storage system 100 includes a storage manager 108 and one or more of the following: a client 102, an information store 106, a data agent 104, a media agent 112, and a secondary storage device 116. The storage system 100 can further include one or more client-side repositories (CSR) 118, which will be described in greater detail below with reference to FIGS. 2 and 3. In addition, the storage system can also include one or more index caches as part of the media agent 112 and/or the storage manager 108. The index caches can indicate, logical associations between components of the system, user preferences, management tasks, and other useful data, as described in greater detail in application Ser. No. 10/818,749, now U.S. Pat. No. 7,246,207, issued Jul. 17, 1007, herein incorporated by reference in its entirety.

As illustrated, the client computer 102 can be communicatively coupled with the information store 106, the storage manager 108, and/or the CSR 118. The information store contains data associated with the client 102. Although not illustrated in FIG. 1, the client 102 can also be in direct communication with the media agent 112 and/or the secondary storage device 116. For simplicity, and not to be construed as limiting, the components of storage system 100 are illustrated as communicating indirectly via the storage manager 108. However, all components of the storage system 100 can be in direct communication with each other or communicate indirectly via the client 102, the storage manager 108, the media agent 112, or the like.

With further reference to FIG. 1, the client computer 102 (also generally referred to as a client) contains data in the information store 106 that can be copied to and then restored from the secondary storage device 116 and/or the CSR 118. In an illustrative embodiment, the client 102 can correspond to a wide variety of computing devices including personal computing devices, laptop computing devices, hand-held computing devices, terminal computing devices, mobile devices, wireless devices, various electronic devices, appliances and the like. In an illustrative embodiment, the client 102 includes necessary hardware and software components for establishing communication with the other components of storage system 100. For example, the client 102 can be equipped with networking equipment and browser software applications that facilitate communication with the rest of the components from storage system 100. Although not illustrated in FIG. 1, each client 102, can also display a user interface. The user interface can include various menus and fields for entering storage and restore options. The user interface can further present the results of any processing performed by the storage manager 108 in an easy to understand format.

A data agent 104 can be a software module that is generally responsible for archiving, migrating, and recovering data of a client computer 102 stored in an information store 106 or other memory location. Each client computer 102 has at least one data agent 104 and the storage system 100 can support many client computers 102. The storage system 100 provides a plurality of data agents 104 each of which is intended to backup, migrate, and recover data associated with a different application. For example, different individual data agents 104 may be designed to handle Microsoft Exchange™ data, Microsoft Windows file system data, and other types of data known in the art. If a client computer 102 has two or more types of data, one data agent 104 may be implemented for each data type to archive, migrate, and restore the client computer 102 data.

The storage manager 108 is generally a software module or application that coordinates and controls the system. The storage manager 108 communicates with all elements of the storage system 100 including the client computers 102, data agents 104, the media agents 112, and the secondary storage devices 116, to initiate and manage system backups, migrations, recoveries, and the like. The storage manager 108 can be located within the client 102, the CSR 118, the media agent 112, or can be a software module within a separate computing device. In other words, the media agent 112, the client 102 and/or the CSR 118 can include a storage manager module. In one embodiment, the storage manager 108 is located in close proximity to the client 102 and communicates with the client 102 via a LAN. In another embodiment, the storage manager 108 communicates with the client 102 via a WAN. Similarly, in one embodiment, the storage manager 108 communicates with the media agent 112 via a LAN, and in another embodiment communicates with the media agent 112 via a WAN.

The storage manager 108 can also deduplicate the data that is being backed up in storage device 116. For example, the storage manager 108 can analyze individual data blocks being backed up, and replace duplicate data blocks with pointers to other data blocks already stored in the secondary storage device 116. To identify duplicate data blocks, the storage manager 108 can perform a hash or other signature function on each data block. The signatures of the different data blocks can be compared. Matching signatures of different data blocks can indicate duplicate data, which can be replaced with a pointer to previously stored data. Other components of storage system 100 can perform the deduplication techniques on the data blocks, such as the media agent 112, the client 102, the CSR 118, and/or storage device 116.

A media agent 112 is generally a software module that conducts data, as directed by the storage manager 108, between locations in the storage system 100. For example, the media agent 112 may conduct data between the client computer 102 and one or more secondary storage devices 116, between two or more secondary storage devices 116, etc. Although not shown in FIG. 1, one or more of the media agents 112 can also be communicatively coupled to one another. In some embodiments, the media agent communicates with the storage manager 108 via a LAN or SAN. In other embodiments, the media agent 112 communicates with the storage manager 108 via a WAN. The media agent 112 generally communicates with the secondary storage devices 116 via a local bus. In some embodiments, the secondary storage device 116 is communicatively coupled to the media agent(s) 112 via a Storage Area Network ("SAN").

The secondary storage devices 116 can include a tape library, a magnetic media secondary storage device, an optical media secondary storage device, or other secondary storage device. The secondary storage devices 116 can further store the data according to a deduplication schema as discussed above. The storage devices 116 can also include a signature block corresponding to each stored data block. As will be described in greater detail below with reference to FIGS. 2 and 3, the signature block can include various information related to the data block and in one embodiment includes the signature block includes a signature of the data block, an archive file identifier (AFID), and an offset.

Further embodiments of storage systems such as the one shown in FIG. 1 are described in application Ser. No. 10/818,749, now U.S. Pat. No. 7,246,207, issued Jul. 17, 1007, which is hereby incorporated by reference in its entirety. In various embodiments, components of the storage system 100 may be distributed amongst multiple computers, or one or more of the components may reside and execute on the same computer.

Furthermore, components of the storage system 100 of FIG. 1 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Figure 2:
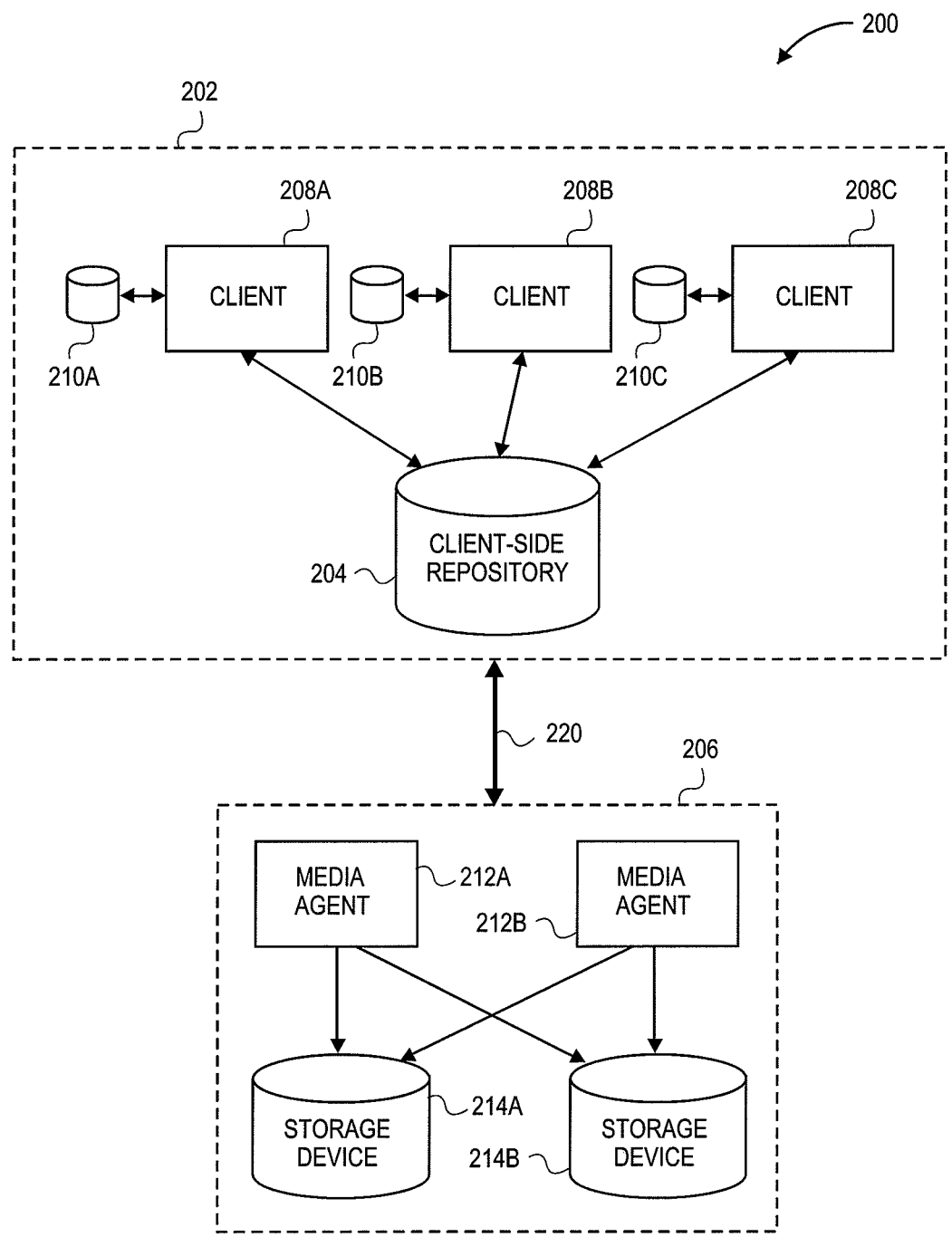

FIG. 2 illustrates a block diagram of an embodiment of a storage system 200 similar to storage system 100 of FIG. 1. The storage system 200 includes a client-side repository (CSR) 204, clients 208A-208c, information stores 210a-210c, the media agents 212a-212b, and the secondary storage devices 214a-214b. Clients 208A-208c, information stores 210a-210c, the media agents 212a-212b, and the secondary storage devices 214a-214b can be similar to the similarly named components of FIG. 1.

As described above with respect to FIG. 1, the various components can communicate directly or indirectly with each other. For simplicity, and not to be construed as limiting, line 220 illustrates communication occurring between any of clients 208a-208c and the CSR 204, line 230 illustrates communication occurring between any of the clients 208A-208c and any of the media agents 212a-212b and/or the secondary storage device 214a-214b, and line 240 illustrates communication occurring between the CSR 204 and any of the media agents 212a-212b and/or the secondary storage devices 214a-214b. Although a storage manager is not illustrated in FIG. 2, communication can also be facilitated via a storage manager.

The storage system 200 also includes a client-side repository (CSR) 204, which can be made up of one or more storage devices. The CSR 204 can also include a computing device having one or more processors. As illustrated, the CSR 204 can be in communication with any of clients 208A-208c ("client 208"), information stores 210a-210c ("information store 210"), the media agents 212a-212b ("media agent 212") and/or the secondary storage devices 214a-214b ("secondary storage device 214"). The CSR 204 can communicate with these devices over any number of different network topologies including, but not limited to, the Internet, VPN, token ring or TCP/IP based network, WAN, LAN, an intranet, point-to-point link, wireless, cellular, wireless data transmission system, two-way cable system, interactive kiosk, satellite, broadband, baseband, combinations of the same, or the like.

In certain embodiments, the CSR 204 is part of a client 208. For example, the client 208 can include additional local storage configured as the CSR 204. In an embodiment, each client 208 has a dedicated CSR 204. For example, each client 208 can communicate with a separate CSR 204 via a LAN. In another embodiment, more than one client 208 shares a CSR 204. In other embodiments, the CSR 204 is in close proximity to the client 208 and communicates with the client 208 using a different network topology than the topology used for communication between the clients 208 and the media agents 212. For example, in an embodiment, the clients 208 communicate with the CSR 204 over a LAN and communicate with the media agents 212 over a WAN. In certain embodiments, communication between the clients 208 and the CSR 204 takes place at a higher data rate than communication between the clients 208 and the media agents 206. By storing data blocks in the CSR 204 the amount of traffic between the clients 208 and the media agents 214 (or storage manager) can be reduced in favor of traffic between the client 208 and the CSR 204. As such, the data blocks stored in the CSR 204 can more quickly or efficiently be restored to the client 208 during restore operations, and traffic over a WAN can be reduced. Furthermore, although not illustrated, the CSR 204 can communicate with the media agents 212 and/or the clients 208 via a storage manager.

In general, the CSR 204 is used by the storage system 200 to store data signature blocks and data blocks, which will be described in greater detail below with reference to FIG. 3, and can restore data blocks to the client 208 in the event of a restore operation. In some embodiments, the data blocks are deduplicated data blocks, and the signature blocks includes signatures of the deduplicated data blocks. In some embodiments, the signatures are hash signatures. As mentioned above, restore times and network resources used can by reduced by locating the CSR 204 in close proximity to the client 208 and communicating via a LAN. Data not restored using the CSR 204 can be restored using the media agent 212 and the secondary storage device 214.

Data can be stored in the CSR 204 at any number of different intervals, such as upon request by a user, during each backup or other storage operation, at set intervals (e.g. daily, weekly, etc.), and the like. In an embodiment, the CSR 204 is populated during each backup or other secondary storage operation associated with a client 208.

Furthermore, the storage system can determine which data blocks to copy to the CSR 204 in a number of ways including, but not limited to, a storage policy such as a policy defining relative priorities associated with the clients, most recently used data blocks, file type, data/file location in the information store 210, backup data/file location in the secondary storage device 214, and the like. The CSR 204 can also store the signature blocks corresponding to each data block. In an embodiment, the CSR 204 is populated during each backup of the client 208 with the most recently used or changed data blocks. In such an embodiment, during backup, the most recently used or changed data blocks from the client 208 as well as corresponding signature blocks are stored in the CSR 204. Any number of different components can determine which data blocks are the most recently used or changed, including the clients 208, the media agents 206, a storage manager, the CSR 204, or the like. In some embodiments, all the data, including the data blocks copied to the CSR 204, is also backed-up in the secondary storage device 214. Furthermore, any one of the various components of the storage system 200 can generate the signature for each data block, such as the client 208, the CSR 204, the media agent 212, and/or a storage manager.

In one embodiment, upon restoring the data of the client 208, the most recently used data blocks are retrieved from the CSR 204 and the rest of the data blocks are retrieved from the secondary storage device 214. The restore request and determining the location from which to restore the data can be accomplished using any number of methods implemented by any one, or a multiple of, the components of storage system 200. In an embodiment a storage manager requests a restore for a particular client 208 and selects the appropriate media agent to conduct the restore. The selected media agent 212 determines which data blocks are to be restored from the CSR 204 and which data blocks are to be restored from the secondary storage device 214.

In such an embodiment, to determine which data blocks are stored in the CSR 204, the media agent 214 can query the CSR 204. A query can include a request for a specific data block, or an acknowledgement that the specific data block is stored in the CSR 204, based on a signature of that data block. In response to the query, the CSR 204 can check a signature block repository to determine if the data block requested is in the CSR 204. In checking the signature block repository, the CSR 204 can compare the signature received in the query with signatures stored in the signature block repository. A match indicates the data block is stored in the CSR 204. If the data block is stored in the CSR 204, the CSR 204 supplies the data block to the client 208. If the data block is not stored in the CSR 204, the media agents 212 can use the secondary storage device 214 to restore the data block to the client 208. The media agents 212 can also include an index of which data blocks are stored in the CSR 204. In this manner, the media agent 212 can use the index to determine which data blocks to restore using the CSR 204 and which data blocks to restore using the secondary storage device 214.

In an embodiment, the media agent 212 can use information regarding data blocks, such as an archive file identifier (AFID), which will be described in greater detail below, to determine if it is likely that a data block is in the CSR 204. Based on the determination, the media agent 212 can determine whether to query the CSR 204 or instead to restore the data block using the secondary storage device 214 and without querying the CSR 204.

In another embodiment, the media agent 212 reduces network traffic by bundling the queries to the CSR 204, e.g., by transmitting multiple queries at the same time, rather than one at a time.

Although the above-embodiment is described in terms of the media agent 212 implementing the restore request, determining which data blocks to restore from the CSR 204, and determining which data blocks to restore from the secondary storage device 214, any of the other components of storage system 200 can implement this process, including, but not limited to, the client 208, the CSR 204, and the secondary storage device 214. For example, the client 208 can request a restore and then determine which data blocks should be restored from the CSR 204 and which data blocks should be restored from the secondary storage device 214. Alternatively, in one embodiment the client 208A requests a restore on behalf of the client 208B, and similarly determines from what location the data blocks should be restored. In another embodiment, a client 208 can request a restore and the media agent 212 can determine the location of the data blocks for the restore and manage the restore. Various components can be used to implement the restore request and determining the location of the data blocks to be restored and managing the restore without departing from the spirit and scope of the description.

Furthermore, the above example describes the CSR 204 being populated with the most recently used or changed data blocks. However, many variations exist for determining which data blocks to store in the CSR 204, and thus which data blocks to restore. For example, in an embodiment, the CSR 204 can be populated based on user-determined criteria, such as specific files and/or folders, or file types. Furthermore, the data blocks stored in the CSR 204 can be based on the original location of the data blocks within the information store 210 or the location of the backed-up copy of the data blocks in the secondary storage device 214, and the like. In addition, client preference can be used to determine which data blocks to store in the CSR 204. For example, in an embodiment, the clients can be given relative priorities with respect to one another. Thus, where client 208A has a higher priority than client 208B, the data blocks from client 208A can be given higher storage priority than the data blocks from client 208B. Accordingly, the system may store data blocks from the client 208A in the CSR 204 for longer periods of time or overwrite data blocks in the CSR 204 that came from the client 208B with data blocks from the client 208A.

In another embodiment, upon receiving a restore request from a client 208, the CSR 204 restores all the data blocks stored therein that are related to the client 208. In such an embodiment, following the restore of the data blocks from the CSR 204, the client 208 (or CSR 204) can supply the media agent 212 with an index of the data blocks restored by the CSR 204. The media agent 212 can restore the remaining data blocks using the secondary storage device 214. In yet another embodiment, upon receiving a restore request from a client 208, the CSR 204 supplies the media agent 212 with an index of the data blocks stored in the CSR 204. The media agent 212 determines which data blocks are to be restored from the CSR 204 and which data blocks are to be restored from the secondary storage device 214. In certain embodiments, a storage manager, the client 208, and/or a different client are to make the determination instead of the media agent 214.

Over time, the data blocks stored in the CSR 204 may be pruned or overwritten based on any of the criteria mentioned above. Thus, overwriting data blocks can be based on time, client preferences, or other criteria as described above. In an embodiment, the data blocks are overwritten based on time. For example, data blocks are stored in the CSR 204 for 10 days and then deleted, or overwritten. In other embodiments, the data blocks are overwritten at different time intervals, such as daily, weekly, monthly, or some other pre-defined time interval. In another embodiment, as data blocks change within an information store 210, they are overwritten in the CSR 204. Thus, the CSR 204 can have the most up-to-date version of the data blocks in the information store 210.

Example Client-Side Repository

Figure 3:
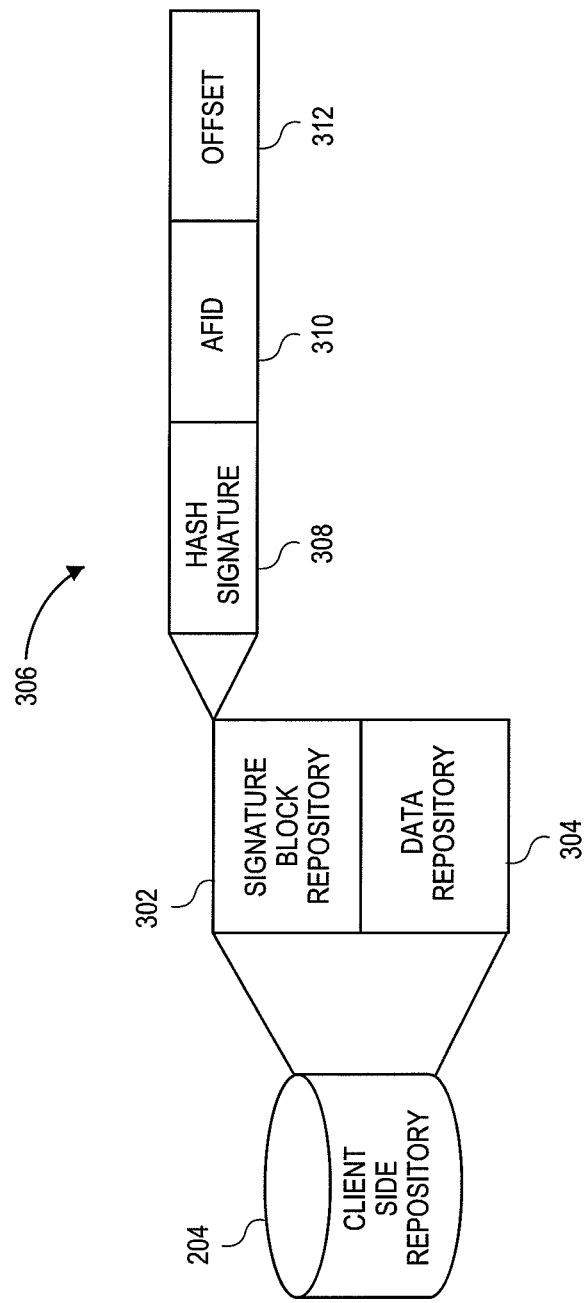
FIG. 3 is a block diagram illustrative of an expanded view of an example client-side repository.

FIG. 3 is a block diagram illustrative of an expanded view of a client-side repository associated with the storage system of FIGS. 1 and 2. As illustrated, the client-side repository 204 can be made up of at least two repositories: a signature block repository 302 and a data repository 304, which will now be explained in greater detail.

The signature block repository 302 includes a signature block 306 for each data block in the data repository 304. Although a variety of implementations are possible, the signature block 306 of one embodiment includes a signature 308, an archive file identifier (AFID) 310, and an offset 312.

When archiving or otherwise copying data blocks, a signature 308 can be derived for a specific data block by performing a hash or other function on the data block. The signature 308 is used to uniquely or substantially uniquely identify the data block and/or determine the likelihood that the data block is a duplicate of an already stored data block with the same signature 308. In one embodiment, the signature 308 is a deduplication signature derived using a deduplication function, such as a hash function.

In an embodiment, the SHA-512 algorithm is used on a 64 kB or 128 kB data block to derive the signature 308. The resulting signature 308 is a 256 bytes, and can be used for deduplication purposes. As illustrated in FIG. 3, in an embodiment, the signature 308 is part of a signature block 306 stored in the CSR 204. Hash functions other than SHA-512 can be used on the data blocks to derive signature 308, as well as other non-hash functions. In addition, different sized signatures 308 may be used without departing from the spirit and scope of the description. Additionally, the signatures 308 for each of the backed up data blocks are also stored at the secondary storage device in certain embodiments. In other cases, the signatures 308 are generated on-the-fly on a per use basis instead of being stored at the CSR 204 and/or the secondary storage device.

The AFID 310 according to certain embodiments provides aging information associated with the data blocks. For example, the AFID 310 in one embodiment includes a number indicative of when the data block was last backed up (or replicated). For instance, the AFID may be a unique identifier associated with a particular backup, backup catalog, or other storage operation associated with the data block. The AFID 310 in some embodiments is generated during a backup operation, e.g., when the data block is backed up. During a restore, the AFID 310 can be used as a handle to get and restore the data block. As shown, the AFIDs 310 can reside in the signature block repository 302 of the CSR 204 and each AFID 310 can be embedded with or otherwise be associated with the hash signature 308 and/or offset 312 of the corresponding data block. Additionally, the AFID 310 in some embodiments is embedded in or is otherwise associated with the respective data blocks, e.g., in the data repository of the CSR 310. In some alternative embodiments, the AFIDs 310 are stored separately from the data blocks in the CSR 204, or are stored at the secondary storage device instead of or in addition to being stored in the CSR 204.

The offset 312 can be used to identify the actual location of the data block in storage. The offset 312 can be made up of one or more bytes of data, and can be used by the CSR 204 or other system component to locate a data block during a restore operation. The offset 312, can be populated during backup operations (or replication or other copy operations) once the location where the data block is to be stored is known. As shown, the offsets 312 can reside in the signature block repository 302 of the CSR 204 and each offset 312 can be embedded with or otherwise be associated with the hash signature 308 and/or AFID 310 of the corresponding data block. Additionally, the AFID 310 in some embodiments is embedded in or is otherwise associated with the respective data blocks, e.g., in the data repository of the CSR 310.

The signature block 306 can have fewer or more parts than what is illustrated in FIG. 3. For example, in an embodiment, the signature block 306 can include only a signature 308. In another embodiment, the signature block 306 can include additional information instead of or in addition to the signature 308, AFID 310 and offset 312. For example, the signature block 306 can include information regarding the source of the data block.

The data repository 304 contains one or more of the data blocks from the information store 210 of the client 208. The data blocks can be stored in any type of format. In one embodiment, the data blocks are deduplicated data blocks and are stored according to a deduplication scheme. Furthermore, the data blocks for multiple clients 208 can be stored in the data repository 304 of the CSR. The data repository 304 can also include an index of the source the client 208 for the different data blocks. Although illustrated as two separate repositories, the data repository 304 and the signature block repository 302 can be a single, co-mingled repository. For example, in an embodiment, a signature block precedes each data block. In another embodiment, the signature blocks are all contained in a group separate from the data blocks. In such an embodiment, each signature block can include a pointer to the corresponding data block, or the offset 312 can indicate the location of the corresponding data block.

Figure 4A:
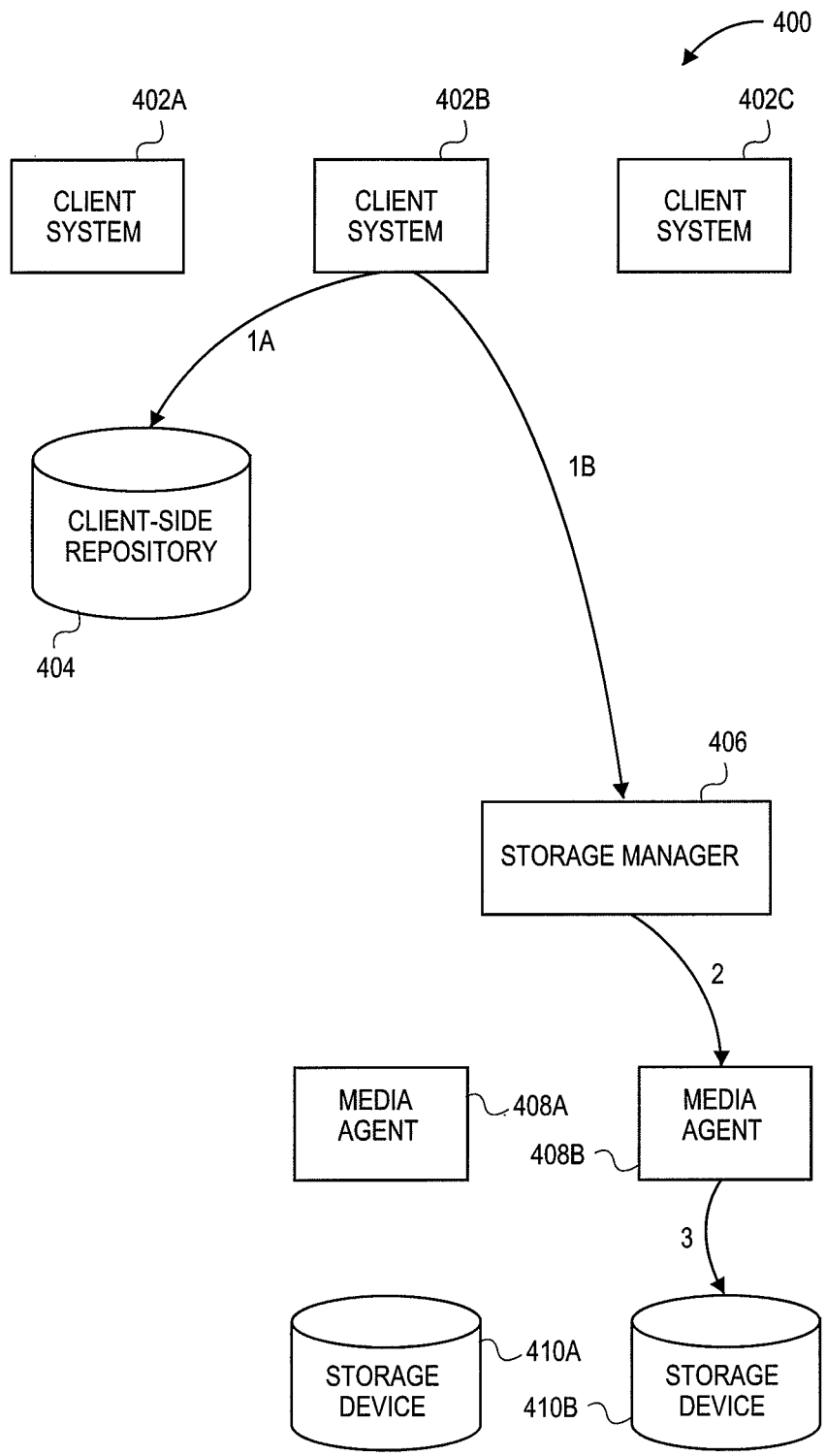
FIGS. 4A-4B are state diagrams illustrative of the interaction between the various components of an example storage system with respect to example backup and restore operations, respectively.
Figure 4B:
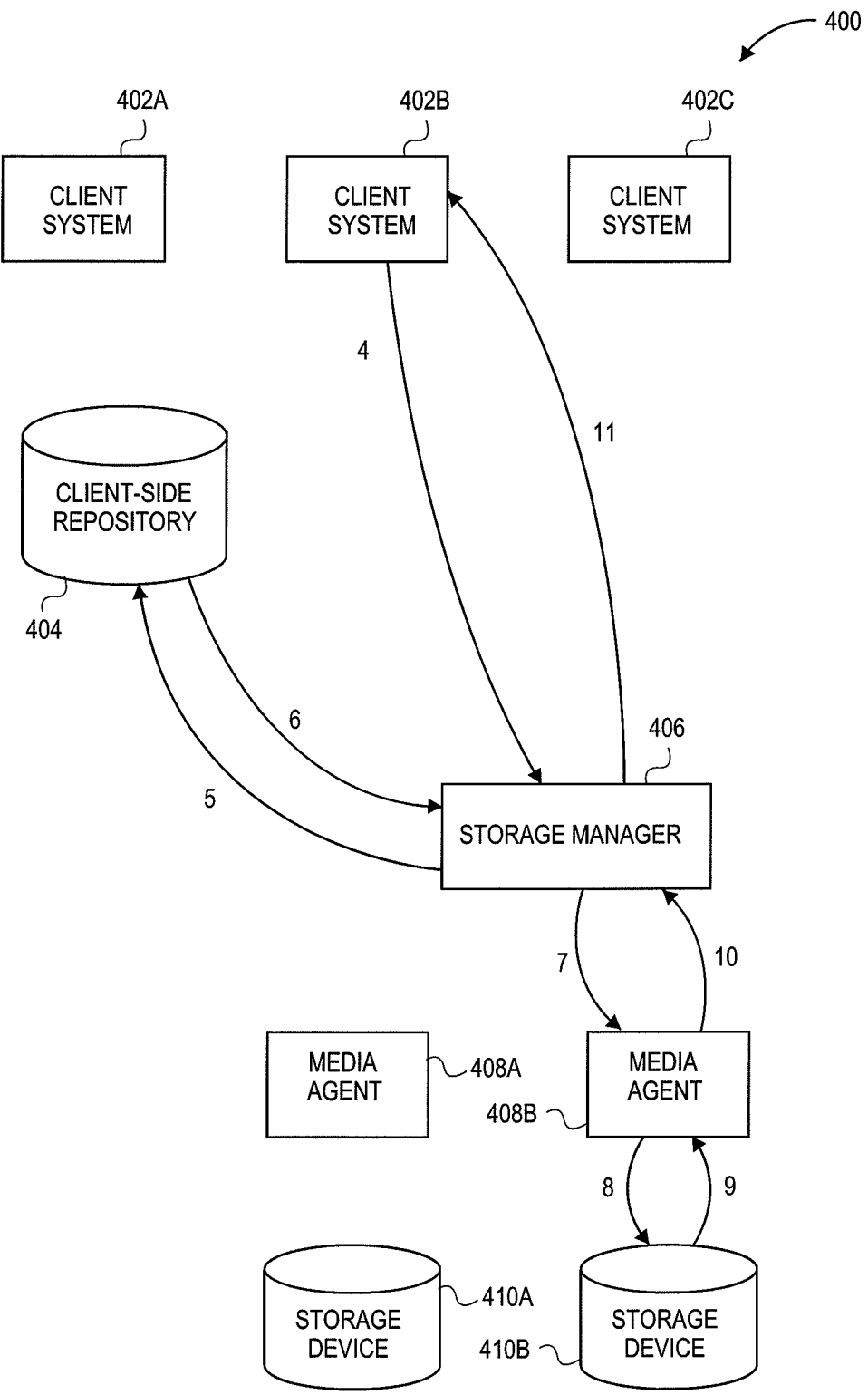

With reference now to FIGS. 4A-4B, the interaction between the various components of a storage system is illustrated with respect to example backup and restore operations, respectively. For example, the storage system may be similar to or the same as either of the storage systems 100, 200 of FIGS. 1 and 2 respectively. For purposes of the example, however, the illustrated example has been simplified to include interaction between one client system 402B and one media agent 408B and associated storage device 410B. In other cases, any of the media agents 408A, 408B and secondary storage devices 410A, 410B, alone or in combination, can be used for backing-up and restoring data blocks from any combination of the client systems 402A-C. Client system 402A-C are similar to the clients discussed with reference to FIGS. 1, and 2. Furthermore, although not shown in FIG. 4, information stores (e.g., primary storage) can associated with each client system.

FIG. 4A is a state a diagram illustrative of the interaction between the various components of the storage system 400 during a backup operation. In an embodiment, a client system 402B initiates a backup of data blocks stored within an information store (not shown) that is associated with the client system 402B.

In initiating the backup, the client system 402B transmits the data blocks to be backed-up to both the CSR 404 and the storage manager 406. In another embodiment, the client system 402B transmits the data blocks to be backed up to the storage manager 406. In turn, the storage manager 406 transmits the data blocks to the CSR 404. In one embodiment, the data blocks are transmitted to the storage manager 406 and the CSR 404 simultaneously, or at approximately the same time. In another scenario, the data blocks are transmitted first to either the CSR 404 or the storage manager 404 and then to the other component.

The backup (or other storage operation) can be initiated in many different ways, such as at predetermined time intervals, upon client request, upon storage manager request, or upon a CSR request. For example, the backup of the client system 402B can occur daily, weekly, monthly or at some other predetermined time interval. Alternatively, the backup can occur based on the client or system administrator selecting the backup from a user interface. In another embodiment one client can initiate the backup for a different client.

The system 400 can determine which data blocks to backup in the CSR 404 in any number of different ways. In some embodiments, all of the data from the client system 402B is copied to the CSR 404, e.g., as it is copied to the secondary storage device 410B. In such embodiments, however, the CSR 404 generally may not be able to retain the entire data image to be backed up. As such, the system 400 implements a data retention policy for the CSR 404. Although a wide variety of retention policies can be used, in one case the system 400 implements a first-in first-out (FIFO) policy in which the least recently written data is pushed out of the CSR 404 in favor of newly written data.

In other embodiments, only some of the data is stored in the CSR 404. Which data blocks to store can be determined based one or more factors, such as most recently used data blocks, location of the backed-up data blocks in the secondary storage device 410B, the communication path between the secondary storage device 410B and the client system 402B, file type of the data blocks, location of data blocks in the information store of the client system 402B or folder location, client preferences, client priorities, and the like.

Additionally, the data can be written to the CSR 404 according to a deduplication policy in which references are written to the CSR 404 in place of data blocks and or signature blocks previously written to the CSR 404.

With continued reference to FIG. 4A, the CSR 404 stores the data blocks and a signature block associated with each data block. The signature block can be determined by the CSR 404, the storage manager 406, the media agent 408B, and/or the client system 402B. In an embodiment where the client system 402B calculates the signature block, the client system 402B can transmit the signature block along with the data block to the CSR 404 and/or the storage manager 406. As discussed previously with reference to FIG. 3, the data blocks and signature blocks can be stored in many different ways and formats without departing from the spirit and scope of the description.

Upon receiving the data blocks for backup, the storage manager 406 proceeds to store the data blocks as described above with reference to FIG. 1 using the media agent 408B and the secondary storage device 410B. As described, the data blocks can be stored using deduplication schemes. In addition, the secondary storage device 410B can also store signature blocks corresponding to each data block. The signature blocks can include a signature, an AFID and an offset, similar to the signature blocks described above with reference to FIG. 3.

FIG. 4B is a state a diagram illustrative of the interaction between the various components of the storage system of FIGS. 1 and 2 during a restore operation. In an embodiment, the client system 402B initiates a restore by requesting a restore of its data from the storage manager 406. The restore request can be initiated by any one of several components of the storage system 400. For example, the restore request can be initiated by a client 402A or 402C on behalf of the client system 402B. Alternatively, the storage manager 405 or the CSR 404 can initiate the restore without a request from the client system 402B. Such a restore may initiate upon the occurrence of some predetermined criteria, such as a power outage, information store error, some other condition that causes a client system to go off-line, addition of a new client, or the like. In one embodiment, the data from the client system 402B can be restored to another client 402A, 402C or a new client.

In response to the restore request, the storage manager 406 queries the CSR 404 for data blocks associated with the client system 402B, although the query can come directly from the media agent 408B in other configurations. The query contains a signature of a specific data block to be restored. In some embodiments, the storage manager 406 maintains an index of the data blocks stored in the CSR 404 based on the responses to the queries, and uses the index to determine which data blocks to restore using the CSR 404 and which data blocks to restore using the secondary storage device 410B. The index can include signature blocks of the data blocks stored in the CSR 404.

In other embodiments, as will be described below with respect to FIG. 8, the storage manager 406 bundles the queries to the CSR 404, rather than transmitting each query separately. In other embodiments, the storage manager 406 queries the CSR 404 for all the data blocks associated with the client system 402B at once.

In response to the queries from the storage manager 406, the CSR 404 determines which of the data blocks requested are stored therein and notifies the storage manager 406. To determine which of the data blocks are stored in the CSR 404, the CSR 404 can compare the signatures received in the queries with the signatures in a signature block repository. Matching signatures indicate the data block is stored in the CSR 404. The CSR 404 can notify the storage manager 406 which data blocks are found, and begin transmitting the data blocks stored therein to the client system 402B. In one embodiment, the CSR 404 responds to the queries with an index of all the queried data blocks stored therein that are associated with the client system 402B, allowing the storage manager 406 to determine which data blocks to restore using the media agent 408B and the secondary storage device 410B. In an embodiment, the index includes a signature of each data block found in the CSR 404.

It will be appreciated that the hand-shaking and flow of data between the components can take a variety of forms. For example, the CSR 404 may await instructions from the storage manager 406 before transmitting any data blocks to the client system 402B. The CSR 404 in one scenario transmits the data blocks stored therein to the storage manager 406 instead of directly to the client system 402B, and the storage manager 406 in turn transmits the data blocks to the client system 402B. In another embodiment, the storage manager 406 generates and maintains an index of the data blocks stored in the CSR 404 as the data is written to and/or cycled out of the CSR 404. In such an embodiment, the storage manager 406 uses the index to determine which data blocks to query and/or restore using the CSR 404 and which data blocks to restore using the secondary storage device 410B.

Upon receiving the response from the CSR 404 regarding the data blocks stored therein, the storage manager 406 restores the remaining data blocks using the media agent 408B and the secondary storage device 410B. The remaining data blocks are retrieved from the secondary storage device 410B and restored to the client system 402B. Although not illustrated, the secondary storage device 410B can communicate directly with the client system 402B to restore the data blocks rather than transmitting the data via the media agent 408B and/or the storage manager 406. Furthermore, as described previously with reference to FIG. 4A, any of the media agents 408A, 408B and the secondary storage devices 410A, 410B can be used to backup and restore data blocks.

One skilled in the art will appreciate that all of the components of storage system 400 are not necessary to store and restore data blocks, and that the processes described herein can be implemented in any number of ways without departing from the spirit and scope of the description. For example, in an embodiment, there is no storage manager 406. In such an embodiment, the client system 402B can query the CSR 404 for the data blocks contained therein and retrieve the remaining data blocks using the media agents 408A, 408B and the secondary storage devices 410A, 410B. In an alternative embodiment, the media agent 408B receives the restore request from the client system 402B, performs the query of the CSR 404, and retrieves the data blocks not found in the CSR 404 from the secondary storage device 410B. In yet another embodiment, the CSR 404 receives the restore request from the client system 402B, restores the data blocks stored therein to the client system 402B, and transmits an index of the data blocks restored to the media agent 408B. In turn, the media agent 408B uses the index to retrieve and restore the remaining data blocks from the secondary storage device 410B and restore the data blocks to the client system 402B. In yet another embodiment, the media agent 408B contains an index of the data blocks stored within the CSR 404. The CSR 404 and the media agent 408B receive the restore request. The CSR 404 restores the data blocks stored therein to the client system 402B. Using the index, the media agent 408B retrieves and restores the data blocks not stored in the CSR 404 from the secondary storage device 410B to the client system 402B. One skill in the art will understand that the data can be stored in any storage device 410A, 410B and can be retrieved using any media agent 408A, 408B without departing from the spirit and scope of the description.

Figure 5:
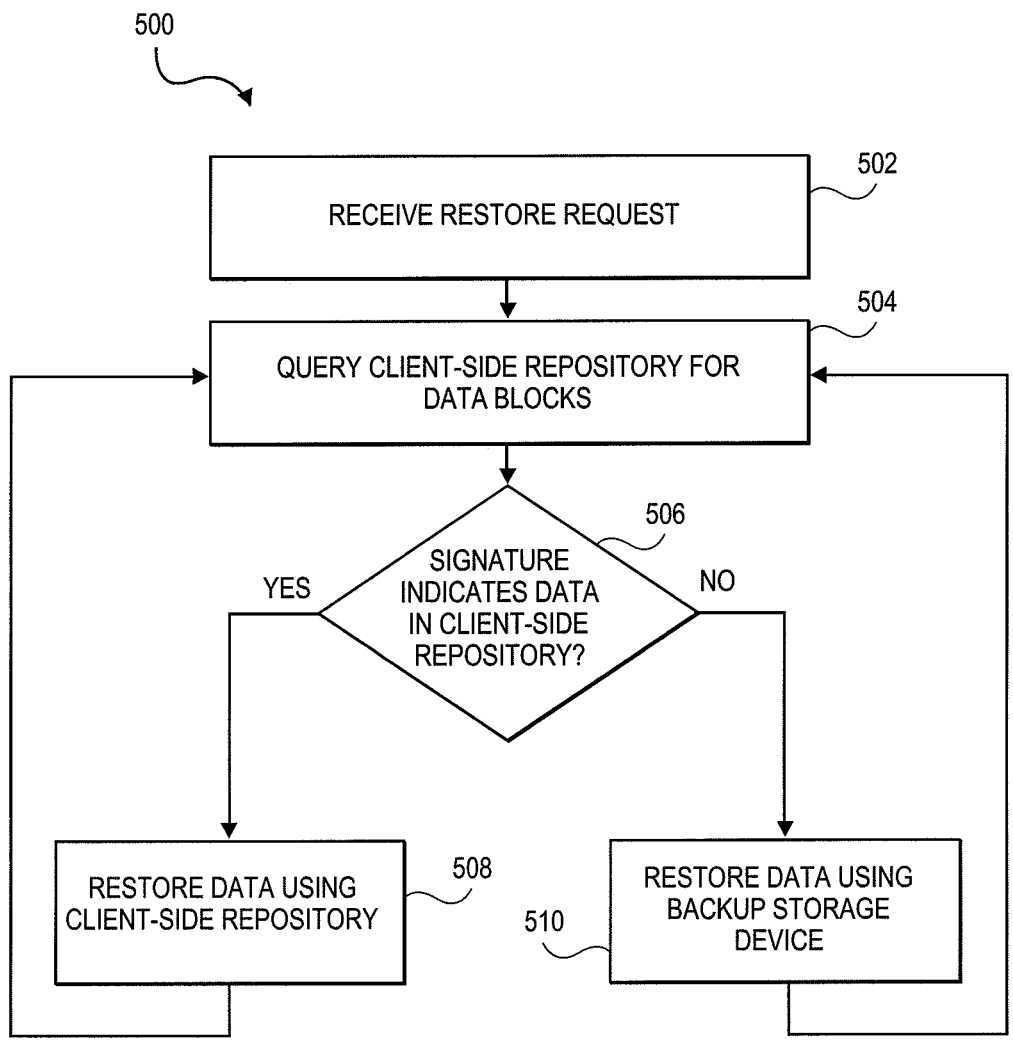
FIG. 5 is a flow diagram illustrative of one embodiment of a routine implemented by a storage system for restoring data using a client-side repository.
Figure 6:
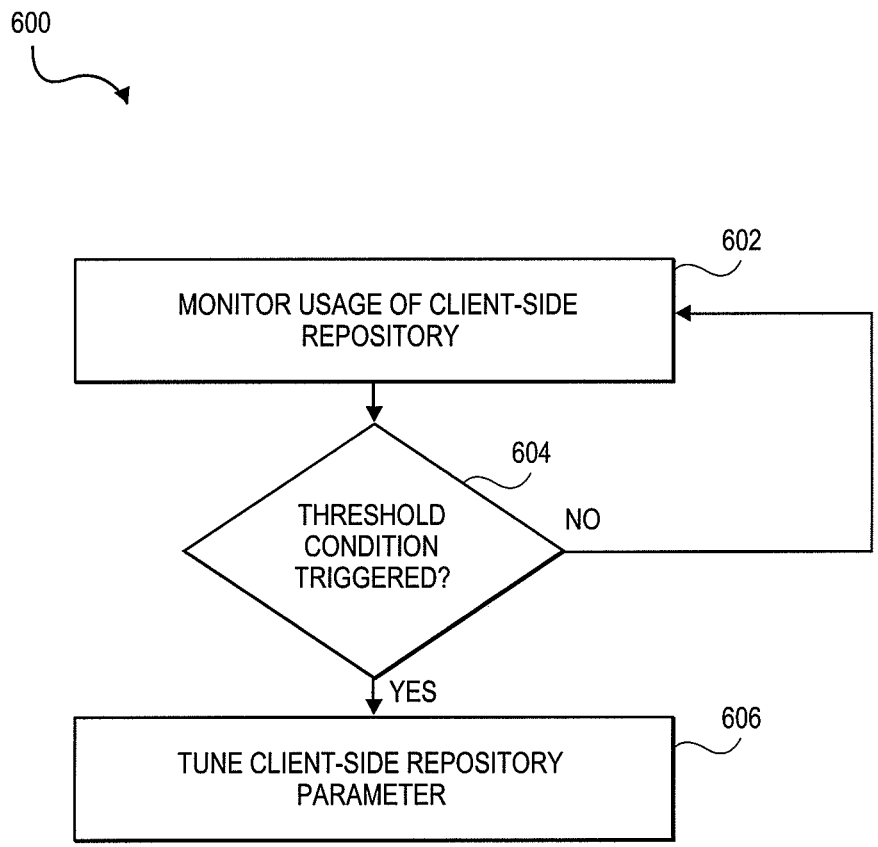
FIG. 6 is a flow diagram illustrative of one embodiment of a routine implemented by a storage system for tuning a client-side repository parameter.
Figure 7:
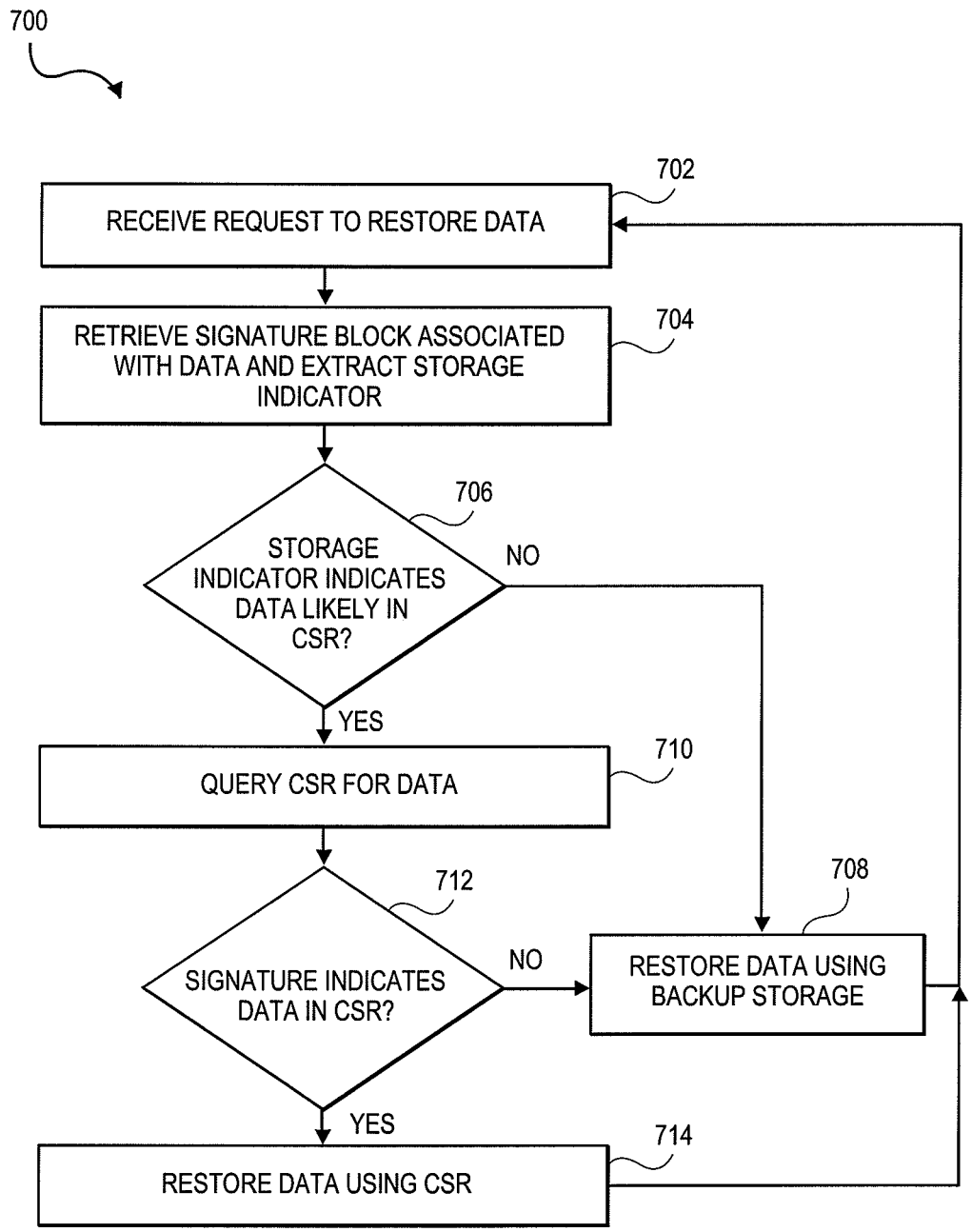
FIG. 7 is a flow diagram illustrative of one embodiment of a routine implemented by a storage system for restoring data using a client-side repository.
Figure 8:
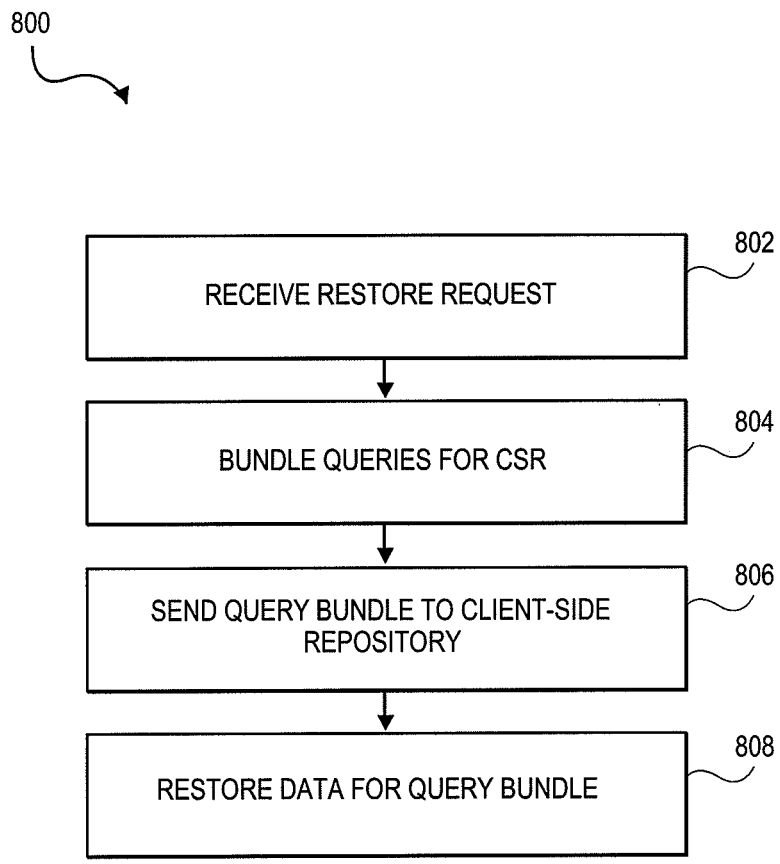
FIG. 8 is a flow diagram illustrative of one embodiment of a routine implemented by a storage system for bundling queries for a client-side repository.

FIGS. 5-8 are flow diagrams illustrative of various processes or routines that the storage system 400 can carry out. FIG. 5 is a flow diagram of a routine implemented by the storage system for processing a restore request and restoring data blocks to a client using a client-side repository. FIG. 6 is a flow diagram of a routine implemented by the storage system for tuning the client-side repository. FIG. 7 is a flow diagram of a routine implemented by the storage system for restoring data blocks to a client using a client-side repository and AFID. FIG. 8 is a flow diagram of a routine implemented by the storage system for bundling queries for a client-side repository.

FIG. 5 is a flow diagram illustrative of one embodiment of a routine 500 implemented by a storage system for processing a restore request and restoring data to a client using a client-side repository. For example, routine 500 can apply to embodiments described in reference to FIGS. 1, 2, 3, 4A, and 4B. One skilled in the relevant art will appreciate that the elements outlined for routine 500 may be implemented by one or many computing devices/components that are associated with the storage system 400. For example, routine 500 can be implemented by any one, or a combination, of the client 402 (i.e. any one of the clients 402A-402C), the CSR 404, the storage manager 406, the media agent 408 (i.e. any one of the media agents 408A-408B) and/or the secondary storage device 410 (i.e. any one of the secondary storage devices 410A-410B). Accordingly, routine 500 has been logically associated as being generally performed by the storage system 400, and thus the following illustrative embodiments should not be construed as limiting.

At block 502, the storage system receives a restore request. The request can be received from or by a client 408, a new client, one client on behalf of another, a storage manager, 406, the media agent 408, or the like. The request can occur automatically upon a reboot, information store error, lost data, predetermined time interval, user selection, or the like.

At block 504, the storage system sends multiple queries to the CSR 404 for data blocks stored therein. In one embodiment, each query comprises a signature block of a data block being searched for. As discussed previously, the CSR 404 contains data blocks previously stored during a backup or other function, as well as signature blocks corresponding to each data block. In an embodiment, the data blocks are deduplicated blocks and the signature blocks are deduplication signature blocks. Upon receiving each query, the CSR 404 checks the data blocks stored therein using the received signature block and a signature block repository, as described above with reference to FIGS. 3 and 4.

At block 506, the storage system determines if a signature block indicates the data block is stored in the CSR 404. In an embodiment, the storage system compares the received signature block with the signature blocks found in the signature block repository. In one embodiment, the signature block indicates the data block is stored in the CSR 404 if a signature block in the signature block repository matches the signature block of the query. If the signature block indicates the data block is stored in the CSR 404, the data block is restored to the client using the CSR 404, as illustrated in FIG. 508. Upon restoring the data block using the CSR 404, the storage system 400, continues to query the CSR 404 for additional data blocks contained therein until all queries have been completed.

On the other hand, if the signature block does not indicate that the data block is stored in the CSR 506, the storage system restores the data block using the secondary storage device 410. Upon restoring the data block using the secondary storage device 410, the storage system 400 continues to query the CSR 404 for additional data blocks contained therein, until all queries have been completed.

One skilled in the art will appreciate that routine 500 can include fewer, more, or different blocks than those illustrated in FIG. 5. For example, rather than restoring each data block at each iteration, storage system 400 can restore all data blocks once all queries are finished. Furthermore, while some data blocks are being restored, additional queries can continue. Thus, some blocks may be performed concurrently with others.

FIG. 6 is a flow diagram illustrative of one embodiment of a routine 600 implemented by the storage system for tuning the client-side repository. For example, routine 600 can apply to embodiments described in reference to FIGS. 1, 2, 3, 4A, and 4B. One skilled in the relevant art will appreciate that the elements outlined for routine 600 may be implemented by one or many computing devices/components that are associated with the storage system 400. For example, routine 600 can be implemented by any one, or a combination, of the client 402, the CSR 404, the storage manager 406, the media agent 408 and/or the secondary storage device 410. Accordingly, routine 600 has been logically associated as being generally performed by the storage system 400, and thus the following illustrative embodiments should not be construed as limiting.

At block 602, the storage system 400 monitors the usage of the CSR 404. The monitoring can occur during backup, restore or other operations, and can be done by any number of components of the storage system including, but not limited to the client 402, the storage manager 406, the media agent 408, or even the CSR 404 itself. In monitoring the usage of the CSR 404, the storage system 400 can generate a metric. Thus, to monitor the usage of the CSR 404, the storage system can analyze the generated metric. The metric can relate to a total amount of data transmitted between the client-side repository and the client system, an amount of data transmitted between the client-side repository and the client system within a predefined time interval, a number of restore operations, a data transmit rate, an amount of network bandwidth used during restore operations, an amount of time used during restore operations, a destination of the data blocks during the restore operation, and the like.

At decision block 604, the storage system 400 determines if a threshold condition is triggered. In one embodiment, the storage system 400 determines if the metric exceeds a predefined threshold. In one embodiment, the threshold condition is threshold amount or size of data transmitted, e.g., within a particular time interval. In another embodiment, the threshold condition is a threshold number of restore requests, which may also be within a particular time interval. The threshold condition may also be a maximum or minimum amount of time taken to transmit data, a percentage of network bandwidth used during restore requests, competing needs for the network, and the like. In general, any combination of the above threshold conditions or other appropriate threshold conditions can be used. For example, in one case, the threshold condition is a predefined amount of data restored from the secondary storage device 410 to the client 402. If storage system 400 determines that the threshold condition is not triggered, the storage system 400 continues to monitor the usage of the CSR 404, as illustrated in block 602. In this manner, if a relatively high percentage of data is being restored from secondary storage rather than from the CSR, the system 400 can react in an appropriate fashion.

Alternatively, if the storage system 400 determines that the threshold condition is triggered, the storage system 400 tunes at least one CSR 404 parameter. The parameter can include, without limitation, the storage capacity or size of the CSR, the function used to generate the signatures, a hash function, a data transfer rate, and client storage priority. The storage system 400 can tune the CSR 404 parameter in one of many different ways, such as increasing the storage capacity of the CSR 404, changing the function used to generate signatures, changing the hash function used to determine the signature hashes, changing storage parameters, changing which clients use the CSR 404, altering the priority given to data from one client relative to another client, and the like. In further configurations, data may be pruned (e.g., deleted or overwritten) from the CSR 404 in response to the threshold condition being triggered.

These changes can be carried out automatically, based upon the threshold being triggered, or upon a client request. For example, in one embodiment, the threshold condition is a predefined amount of data being restored using the secondary storage device 410. Once storage system 400 detects the threshold condition is met, it tunes the CSR 404 to better accommodate the storage needs of the client 402. In one embodiment, storage system 400 tunes the CSR 404 by increasing its storage capacity. Increasing the storage capacity of the CSR 404 can reduce the number of requests made to the secondary storage device 410 to restore data, thereby decreasing the restore time of the client 402 and increasing available network bandwidth. Storage capacity of the CRS 404 can be increased by allocating additional media to the CSR 404 or by pruning the CSR 404, e.g., by deleting data that is used relatively infrequently.

FIG. 7 is a flow diagram illustrative of one embodiment of a routine 700 implemented by the storage system for restoring a client using AFIDs associated with the data blocks stored in the CSR 404. For example, routine 700 can apply to embodiments described in reference to FIGS. 1, 2, 3, 4A, and 4B. One skilled in the relevant art will appreciate that the elements outlined for routine 700 may be implemented by one or many computing devices/components that are associated with the storage system 400. The process 700 can be implemented by any one, or a combination, of the client 402, the CSR 404, the storage manager 406, the media agent 408 and/or the secondary storage device 410. Accordingly, routine 700 has been logically associated as being generally performed by the storage system 400, and thus the following illustrative embodiments should not be construed as limiting.

Similar to block 502 of FIG. 5, at block 702, the storage system receives a request to restore data to a client system. In an embodiment, the data is made up of a plurality of deduplicated data blocks. Upon receiving the request, the storage system 400 in one embodiment retrieves a signature block of at least one of the deduplicated data blocks to be restored, and extracts a storage indicator from the signature block. The signature block may be organized in a manner similar to the signature block shown in FIG. 3, for instance, or in some other manner. In one embodiment, the storage system retrieves just the storage indicator, and not an entire signature block. The storage indicator provides aging information or information related to some other parameter associated with the data block. In one embodiment, the storage indicator is an AFID. Whether or not the storage indicator is associated with the signature block, the storage indicator can be retrieved in a variety of manners. For instance, storage indicator for each data block may be received along with the restore request, or the media agent may retrieve the storage indicator by consulting a separate table or index, e.g., by using a signature associated with the data block. In various embodiments, the storage indicator may be transmitted from the client-side repository, e.g., over the WAN, may be retrieved from local storage by the media agent or other component, or may be transmitted to the media agent over a LAN, e.g., from another media agent, from the storage manager, or from secondary storage. In one embodiment, the media agent requests the storage indicator from the CSR, e.g., by sending a signature to the CSR corresponding to the data block, and the CSR returns the appropriate storage indicator.

At decision block 706, the storage system determines whether or not to query the CSR 404 for the particular data block(s) in the file that is being restored. For instance, the storage system may review the storage indicator to determine whether it is likely that the data block is in the CSR 404. The media agent or other component of the storage system can make this determination in several different ways. For example, in one embodiment, based on the AFID or other storage indicator, the media agent determines the age of the data block. The age may be an indication of when the data block was last involved in a copy operation, for example. For instance, the AFID may correspond to a unique identifier for a particular copy (e.g., backup) session. The media agent may have access to a list indicating when each copy session took place, and can correlate the AFID associated with the requested data block to the list. A variety of other mechanisms are possible to provide aging information. In one embodiment, the AFID provides a direct numerical indication of the age of the data block. For instance, in one embodiment the AFID may increment as each block (or group of blocks) is created.

In an embodiment, where the CSR deletes data blocks after a set time interval, the storage system can use the determined age of the storage indicator to determine if it is likely that the data block is stored in the CSR 404. As one example, if data blocks are deleted after 10 days, and the AFID indicates that the data block was last backed up more than 10 days ago, the media agent may determine that the data block has likely been pruned from the CSR 404 and is therefore not likely currently stored in the CSR 404. On the other hand, if the AFID indicates that the data block was last backed up less than 10 days ago, the media agent may determine that the data block is likely to be found in the CSR 404.

While described primarily with respect to the AFID for the purposes of illustration, the type of information provided by the storage indicator may vary. For example, in another embodiment, storage indicator provides an indication as to the source of the data block, such as an indication as to which client or clients the data block was backed up from. The storage system can use the information regarding the source(s) of the data block to determine if the data block is likely stored in the CSR 404. For instance, more than one client may share the CSR, but have different priorities with respect to the CSR. Where the storage indicator indicates that the data block came from a client having a relatively high priority with respect to the CSR, the media agent may determine that the data block is likely stored in the CSR. In addition to a client priority policy, other CSR policies can be used such as update frequency, the CSR pruning algorithm (e.g., first-in-first-out), and the like. Generally, any combination of any of the above parameters can be used instead of or in addition to the AFID or other aging information to determine the likelihood that the particular data block is stored in the CSR.

If it is determined that the data block is not likely stored in the CSR 404, then storage system 400 restores the data block using the secondary storage device 410, as described in greater detail above with reference to block 510 of FIG. 5. On the other hand, if the storage system 400 determines that it is likely that the data block is in the CSR 404, the storage system 400 can query the CSR 404 for the data block, as illustrated in block 710, and as described in greater detail above with reference to block 504 of FIG. 5.

Following the query, the storage system 400 determines if the signature block indicates that the data block is in the CSR 404, as described in greater detail above with reference to decision block 506 of FIG. 5. If the storage system 400 determines that the data block is not within the CSR 404, the storage system restores the data block using the secondary storage device 410, as illustrated in block 708 and described in greater detail above with reference to block 510 of FIG. 5. On the other hand, if the storage system 400 determines that the data block is stored within the CSR 404, the storage system restores the data block using the CSR 404, as illustrated in block 714 and described in greater detail above with reference to block 508 of FIG. 5. In a similar manner, storage system 400 can restore multiple data blocks associated with a particular client. In alternative embodiments, the media agents or other system components are provided with an up to date or substantially up to date listing of what data blocks are stored in the CSR, and may therefore not perform the query. For instance, the CSR may transmit the updates to the media agents and/or storage manager periodically or as blocks are stored in and pruned from the CSR. In yet further embodiments, the media agent queries the CSR for all of the data blocks without determining the likelihood that the data block is stored in the CSR.

FIG. 8 is a flow diagram illustrative of one embodiment of a routine 800 implemented by the storage system for restoring data blocks to a client using a CSR 404 and an AFID. For example, routine 800 can apply to embodiments described in reference to FIGS. 1, 2, 3, 4A, and 4B. One skilled in the relevant art will appreciate that the elements outlined for routine 800 may be implemented by one or many computing devices/components that are associated with the storage system 400. For example, routine 800 can be implemented by any one, or a combination, of the client 402, the CSR 404, the storage manager 406, the media agent 408 and/or the secondary storage device 410. Accordingly, routine 800 has been logically associated as being generally performed by the storage system 400, and thus the following illustrative embodiments should not be construed as limiting.

As discussed previously, during backups all of the data is stored in the secondary storage device 410 as data blocks. However, to expedite restores, some data blocks can also be stored in the CSR 404. During a restore, queries are sent to the CSR 404 to determine which data blocks are stored therein. Each query includes a request for a specific data block potentially stored in the CSR 404. Over the course of a restore there may be many queries sent to the CSR 404. These queries may use network bandwidth that could more effectively be used elsewhere, especially when the queries are made over a WAN. To reduce the network traffic, storage system 400, can bundle the queries, as will be described in greater detail below with reference to FIG. 8. The storage system can implement bundling based on a predefined number of queries, network bandwidth, data/file location within the secondary storage device or information store of the client, and the like Similar to block 502 of FIG. 5, at block 802, the storage system 400 receives a request to restore data. In one embodiment, the data blocks to be restored are a deduplicated data blocks. At block 804, the storage system bundles a number of queries for a set of data blocks. As mentioned previously, each query can contain a signature block corresponding to a data block that is to be restored to the client. The queries can be bundled in any number of ways, such as based on a signature block value, an AFID value, a time of query, a set number of queries, a location of client, a client identification, a location of data block in the secondary storage device or CSR, and/or pseudo-randomly. For example, in one embodiment, all the queries can be bundled together. Alternatively, some or all of the queries for data blocks that are likely to be found in the CSR 404 can be bundled together. In another embodiment, a set number of queries are bundled.

At block 806, the bundled queries are sent to the CSR 404, similar to what is described above with reference to block 504 of FIG. 5. Upon receiving the bundled queries, the CSR 404 parses the bundled queries into the individual queries and determines which data blocks corresponding to the queries are stored therein. Following the determination made by the CSR 404, the storage system 400 restores the requested data, as illustrated in block 808. The data blocks stored in the CSR 404 are restored using the CSR 404, while the data blocks not stored in the CSR 404 are restored using the secondary storage device 410.

The bundling process 800 of FIG. 8 can advantageously be used in conjunction with the process 700 of FIG. 7. Thus, in one embodiment the media agent or other appropriate component first determines whether data blocks are likely to be found in the CSR according to the process 700 of FIG. 7, and then bundles queries according to the process 800 of FIG. 8 for the data blocks that are likely to be found in the CSR. In another embodiment, the media agent bundles the queries according to the process 800 of FIG. 8 and then determines which of the data blocks corresponding to the bundled queries are likely to be found in the CSR. The media agent may then only transmit the queries in the respective bundles that are likely to be found in the CSR.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It is also recognized that the term "remote" may include data, objects, devices, components, and/or modules not stored or located locally, or that are not accessible via the same portion of a network, using the network topology, etc. Thus, a remote device may be located in a separate geographic area, such as, for example, in a different location, country, and so forth. The meaning of the term "remote" will additionally be understood in view of its usage throughout the entirety of the disclosure.

In certain embodiments of the invention, operations disclosed herein can be used to copy or otherwise retrieve data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc., and as further described in U.S. Pat. No. 7,454,569, issued Nov. 18, 2008, which is hereby incorporated herein by reference in its entirety.

Storage operations compatible with embodiments described herein will now be described. For example, data can be stored in primary storage as a primary copy or in secondary storage as various types of secondary copies including, as a backup copy, a snapshot copy, a hierarchical storage management copy ("HSM"), an archive copy, and other types of copies. Certain embodiments described herein with respect to backup operations are similarly compatible with each of these types of operations.

A primary copy of data is generally a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy is generally a point-in-time copy of the primary copy data stored in a backup format, as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot may be created instantly, using a minimum amount of file space, but may still function as a conventional file system backup. A snapshot may not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy is generally a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy is generally similar to an HSM copy. However, the data satisfying criteria for removal from the primary copy is generally completely removed with no stub left in the primary copy to indicate the new location (i.e., where the archive copy data has been moved to). Archive copies of data are generally stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for restoring data to a client system from one or more secondary storage devices, the method comprising:
receiving a request to restore data to a native format on a client system from data stored in a backup format on one or more secondary storage devices where the backup format is different than the native format;
querying a client-side repository with a plurality of hash signatures to determine that at least a first portion of the restore data is stored in the backup format on the client-side repository and a second portion of the restore data is stored in a backup format on the one or more secondary storage devices, the client-side repository is stored on a storage device that is different than the one or more secondary storage devices;
accessing the first portion of the restore data stored in the client-side repository and restoring the first portion to the native format;
accessing over a network the second portion of the restore data stored in the one or more secondary storage devices and restoring the second portion to the native format; and
monitoring usage of the client-side repository and the one or more secondary storage devices and pruning data in the client-side repository stored in the backup format based at least in part on a percentage of bandwidth of the network used during a request to restore at least the second portion of the restore data.

2. The method of claim 1 wherein the client system communicates with the client-side repository via a local area network and the client system communicates with the one or more secondary storage devices via a wide area network.

3. The method of claim 1 further comprising consulting age information to determine a time of the creation of a secondary copy in secondary storage of at least one data block associated with the restore data.

4. The method of claim 3 wherein the age information comprises a copy session identifier identifying a particular copy session associated with the at least one data block associated with the restore data.

5. The method of claim 3 wherein the age information is indicative of when the at least one data block associated with the restore data was stored at the one or more secondary storage devices.

6. The method of claim 3 wherein the age information is indicative of when the at least one data block associated with the restore data was stored at the one or more secondary storage devices relative to when one or more other data blocks were stored at the one or more secondary storage devices.

7. The method of claim 3 wherein the age information provides an indication as to the likelihood that the at least one data block associated with the restore data was pruned from the client-side repository.

8. The method of claim 3 further comprising querying the client-side repository when the age information satisfies a threshold age.

9. The method of claim 1 wherein a secondary copy of at least one data block was previously copied to the one or more secondary storage devices during a backup operation.

10. The method of claim 1 wherein a secondary copy of at least one data block was previously copied to the one or more secondary storage devices during a replication operation.

11. A storage system comprising:
one or more secondary computing devices that execute on at least one one or more processors, the one or more secondary computing devices configured to store data in a backup format in one or more secondary storage devices and to receive a request to restore data to a client system in a native format, the one or more secondary computing devices further configured to:
query a client-side repository with a plurality of hash signatures to determine that at least a first portion of the restore data is stored in the backup format on client-side repository and at least a second portion is stored in a backup format in the one or more secondary storage devices, the client-side repository is stored on a storage device that is different than the one or more secondary storage devices;
access at least the first portion of the restore data stored in the client-side repository, and restore the first portion to the native format;
access over a network at least the second portion of the restore data stored in the one or more secondary storage devices, and restore the second portion to the native format; and
monitor usage of the client-side repository and the one or more secondary storage devices and prune data in the client-side repository based at least in part on a percentage of bandwidth of the network used during a request to restore at least the second portion of the restore data.

12. The storage system of claim 11 wherein the client system communicates with the client-side repository via a local area network and the client system communicates with the one or more secondary storage devices via a wide area network.

13. The storage system of claim 11 wherein the one or more secondary computing devices consults age information to determine a time of the creation of a secondary copy in secondary storage of at least one data block associated with the restore data.

14. The storage system of claim 13 wherein the age information comprises a copy session identifier identifying a particular copy session associated with the at least one data block associated with the restore data.

15. The storage system of claim 13 wherein the age information is indicative of when the at least one data block associated with the restore data was stored at the one or more secondary storage devices.

16. The storage system of claim 13 wherein the age information is indicative of when the at least one data block associated with the restore data was stored at the one or more secondary storage devices relative to when one or more other data blocks were stored in the one or more secondary storage devices.

17. The storage system of claim 13 wherein the age information provides an indication as to the likelihood that the at least one data block associated with the restore data was pruned from the client-side repository.

18. The storage system of claim 13 wherein the one or more secondary computing devices perform the query of the client-side repository when the age information satisfies a threshold age.

19. The storage system of claim 11 wherein secondary copy of at least one data block was previously copied to the one or more secondary storage devices during a backup operation.

20. The storage system of claim 11 wherein secondary copy of at least one data block was previously copied to the one or more secondary storage devices during a replication operation.

* * * * *